US006172428B1

(12) United States Patent
Jordan

(10) Patent No.: US 6,172,428 B1
(45) Date of Patent: Jan. 9, 2001

(54) DIGITAL CONTROL SYSTEM AND METHOD FOR GENERATOR SETS

(75) Inventor: Thomas Harmon Jordan, Mesquite, TX (US)

(73) Assignee: Westwood Corporation, Tulsa, OK (US)

(*) Notice: Under 35 U.S.C. 154(b), the term of this patent shall be extended for 0 days.

(21) Appl. No.: 09/224,562

(22) Filed: Dec. 30, 1998

(51) Int. Cl.[7] .................................................. F02D 28/00
(52) U.S. Cl. ..................................... 290/40 C; 290/40 R
(58) Field of Search .................................. 290/1 A, 4 R, 290/4 A, 40 C; 322/1; 123/179

(56) References Cited

U.S. PATENT DOCUMENTS

| | | | |
|---|---|---|---|
| 3,835,819 | * 9/1974 | Anderson, Jr. .................. | 123/32 EA |
| 4,465,920 | * 8/1984 | Hoyt, Jr. et al. ..................... | 219/133 |
| 4,551,803 | * 11/1985 | Hosaka et al. .................. | 364/431.05 |
| 4,603,394 | * 7/1986 | Bukowski et al. .................. | 364/494 |
| 5,075,616 | * 12/1991 | Mitsui .................................... | 322/10 |
| 5,168,208 | 12/1992 | Schultz et al. ......................... | 322/25 |
| 5,596,261 | * 1/1997 | Suyama ................................. | 320/48 |
| 5,789,822 | * 8/1998 | Calistrat et al. .................. | 290/40 A |
| 5,861,604 | * 1/1999 | McLean et al. .................. | 219/130.5 |

OTHER PUBLICATIONS

Specification Sheet: Power–Plus ECU–110/E Motor–Generator Set 60HZ–400Hz Frequency Converter; K & R Generator Co., Inc., 916 North Main Street, Seymour, WI 54165 U.S.A., May 1995.
Instructional Sheets: Delivered to customer for customer use on May 17, 1995: Winch Controller and Test Station Software Program by Thomas Jordan, for EPRI / PDC at Haslet.
"FactoryView Real–Time, Interactive Data Access Solutions" (Mar., 1997), published by Intelligent Instrumentation, 6550 S. Bay Colony Dr., MS130, Tucson, Arizona 85706–7148; cover page; table of contents (2 pages.); pp.10–13 and pp. 42–43.

"Service Manual (Preliminary Copy) Electronic Modular Control Panel II+)" by Caterpillar®(Sep. 11, 1996) provided to customer; cover page; pp. 1–62; and unnumbered page labeled as "Instrument Panel Layout".

* cited by examiner

Primary Examiner—Nicholas Ponomarenko
(74) Attorney, Agent, or Firm—Fulbright & Jaworski L.L.P.

(57) ABSTRACT

A digital control system and method for monitoring, acquiring data, and controlling the operation of a generator set. The digital control system comprises a computer that receives multiple discrete parameter inputs representing values of analog characteristics and digital characteristics of a generator set. The computer runs a software program to interpret the received inputs as measurements of analog characteristics and status of digital characteristics of the generator set. The computer is capable of graphically displaying and monitoring the measurements and status of the generator set. A method of monitoring and controlling a generator set comprises receiving multiple discrete parameter inputs representing the value of analog and digital characteristics of a generator set, interpreting the received inputs as measurements of analog characteristics and status of digital characteristics of the generator set, and graphically displaying the measurements and status of the generator set. Advantages of the digital control system include the capability to provide a user-friendly graphical display to an operator of a generator set, the capability to display interactive messages that may recommend actions to take in response to a detected fault, the capability to provide warnings based upon multiple discrete parameter inputs, the capability to provide multiple levels of warnings varying in degree of severity, and the capability to write entries to a data file containing information about the operation of the generator set periodically and upon occurrence of a fault.

85 Claims, 8 Drawing Sheets

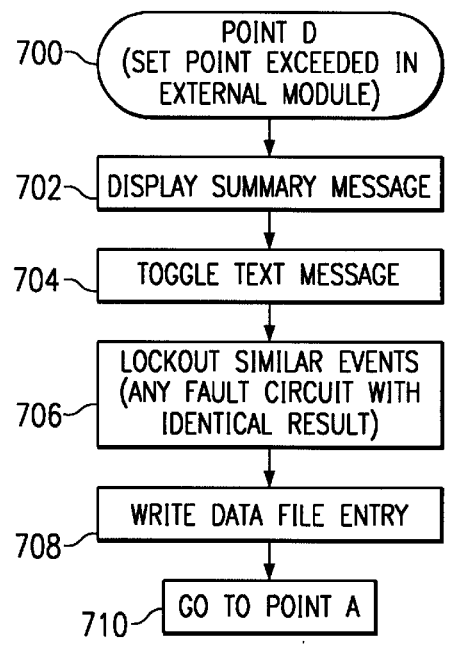
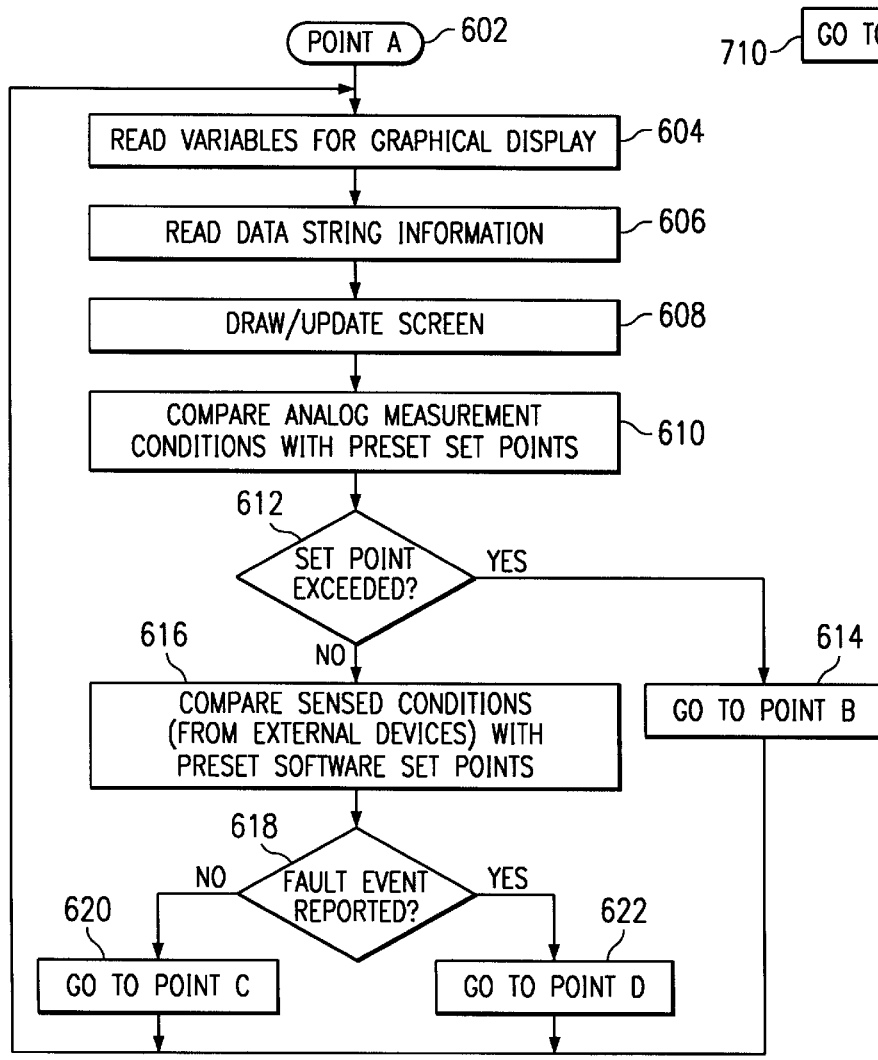

# DIGITAL CONTROL SYSTEM AND METHOD FOR GENERATOR SETS

RELATED APPLICATIONS

This application is related to co-filed and commonly assigned U.S. application Ser. No. 29/098,451 entitled "DIGITAL CONTROL SYSTEM USER INTERFACE" (which has since issued into U.S. Pat. No. Des. 416,544), the disclosure of which is hereby incorporated herein by reference.

NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention relates generally to a Digital Control System and method, and more particularly to a Digital Control System and method for generator sets.

BACKGROUND

Electrical generator sets may be used to provide electrical power to a location without electricity. Exemplary uses for generator sets include providing electrical power for military site operations, outdoor festivals and concerts. Various types of generator sets exist, such as diesel, gas, natural gas, and turbine generator sets. Mobile generator sets are of particular importance to military operations in which power is required for a remote military village or other military operations.

To promote proper operation of a generator set, most generator sets contain some type of control panel that allows an operator to view information about the set's performance, such as the voltage output level. Most control panels also allow an operator to control the operation of the generator set, such as increasing or decreasing the output voltage level by toggling a switch on the control panel. Prior art generator sets have an analog, electro-mechanical display and control system. More specifically, prior art generator sets display information, such as voltage output level, to operators on analog gauges. Also, prior art control panels only allow operators to control the operation of a generator set by interacting with electromechanical switches. Analog controller systems are widely used in the control of electrical generator sets.

An example of a prior art generator set having an analog, electromechanical display and control devices is generator set Model # ECU-110 E/A built by MCII, Inc., of Dallas, Tex. The ECU-110 generator set is a 250 KW generator set. The analog, electromechanical display and control device (i.e., control panel) for the ECU- 110 is illustrated in FIG. 1. As shown in FIG. 1, the prior art control panel contains an Hourmeter 2 which operates much like an odometer on an automobile. Hourmeter 2 indicates the total accumulated operating time of the generator set in hours and tenths of hours. Output voltmeter 3 is an analog meter that indicates the line-to-neutral voltage on a 0–150 volts AC scale for the phase selected with the output voltmeter/ammeter selector switch 20. Output Ammeter 4 is an analog meter that indicates the total output current on a 0–1000 Amperes AC scale for the phase selected with the output voltmeter/ammeter selector switch 20.

POWER ON light 5 illuminates when supply power to the generator set is available for starting the unit. MOTOR ON light 6 illuminates when starting the motor and after the motor is started to indicate that the motor is operating. GEN. READY light 7 illuminates when the generator set is ready to accept a load. INPUT POWER FAULT light 8 illuminates when there is an input power fault. Faults that will illuminate the light are: (a) Ground Fault, (b) Reverse Phase Sequence, (c) Over or Under Input Voltage, and (d) Motor Overload. After the fault is corrected, the fault circuit must be cleared with the fault RESET switch 11.

OVERHEAT light 9 illuminates when the motor overheats, which will shut down the generator set. GENERATOR OVER VOLTAGE light $10_A$ will illuminate when the generator set's output voltage rises above safe operating limits. GENERATOR UNDER VOLTAGE light $10_B$ will illuminate when the generator set's output voltage falls below safe operating limits. Either of these conditions will disconnect the generator set from the load.

Fault RESET switch 11 is used to clear the input fault circuit after an input fault has occurred, and the INPUT POWER FAULT light 8 is illuminated. After the fault has been corrected, depressing Fault RESET switch 11 will clear the input fault circuit. Overheat RESET switch 12 is used to clear the temperature fault circuit after an overheat condition has occurred and the OVERHEAT light 9 is illuminated. After the fault has been corrected, depressing Overheat RESET switch 12 will clear the temperature fault circuit. OV-UV RESET switch 13 is used to clear the over or under voltage circuit after an over or under voltage condition has occurred, and either the GENERATOR OVER VOLTAGE light $10_A$ or the GENERATOR UNDER VOLTAGE light $10_B$ is illuminated. After the condition has been corrected, depressing OV-UV RESET switch 13 will clear the over or under voltage circuit. SHORT CKT. RESET switch 14 is used to clear the fault circuitry after a short has occurred and the condition has been corrected.

60 HZ RECEPT Circuit Breaker 15 is a circuit breaker that protects the convenience receptacle from excessive current. Depressing this circuit breaker will restore the circuit after the circuit breaker has been tripped by excessive current. VOLT. ADJ. Control 16 adjusts automatic voltage regulation over a range of −10 to +10 percent of rated voltage. Turning the control clockwise increases the output voltage for the generator set. LINE DROP ADJ. Control 17 increases the output voltage from 0 to 7.5 percent of rated voltage to compensate for voltage drop from the generator to the load caused by impedance of the load wires. Turning the control clockwise increases the output voltage.

MOTOR START pushbutton 18 will start the motor when depressed and cause MOTOR ON light 6 to illuminate. MOTOR STOP pushbutton 19 will stop the motor when depressed and cause MOTOR ON light 6 to go out. Output Voltmeter/Ammeter Selector switch 20 is a four-position rotary switch. The switch provides the selection of line-to-neutral voltage and current indications for any one of the three output phases of the generator. The indications for the phase selected will appear on the Voltmeter 3 and Ammeter 4. When the switch is turned to the OFF position, the Voltmeter 3 and Ammeter 4 indications will be 0.

SENSING REMOTE/LOCAL switch 21 is a two-position toggle switch. When the switch is placed in the LOCAL position, the voltage regulator will sense output voltage at the generator set's output, and when the switch is placed in the REMOTE position, the voltage regulator will sense output voltage at the load. REG. CKT. BKR. 22 is the Regulator Circuit Breaker, which protects the voltage regulator from an overload. When the circuit breaker is tripped the generator exciter field current is interrupted, which causes the output voltage to collapse. The circuit breaker may be reset by pushing REG. CKT. BKR. 22 inward. 312 KVA OUTPUT CONTACTOR OPEN light 23, when illuminated, indicates that the main output contactor is open. 312 KVA OUTPUT CONTACTOR CLOSED light 24, when illuminated, indicates that the main output contactor is closed, supplying output power to the load. 312 KVA OUTPUT CONTACTOR OVERCURRENT TRIP light 25, when illuminated, indicates that the main output contactor is tripped and the generator is shutdown.

312 KVA OUTPUT CONTACTOR ON 26 pushbutton will close the main output contactor when depressed, supplying output power to the load and causing the CLOSED light 24 to illuminate. 312 KVA OUTPUT CONTACTOR OFF pushbutton 27 will open the main output contactor and disconnect the generator from the load when depressed, which will cause OPEN light 23 to illuminate. PANEL LIGHTS ON/OFF switch 28 is a two-position toggle switch. Placing the switch in the ON position will illuminate the 2 hooded panel lights 29, and placing the switch in the OFF position will tun the panel lights 29 off. LOAD BANK ON/OFF switch 30 bypasses the output contactors sensing contacts when placed in the ON position, which allows the output contactors to be manually controlled for load bank testing. The switch is placed in the OFF position for normal operation.

CABLE OVERLOAD RESET switch 31 clears any of the 4 OVERCURRENT TRIP lights 34 when depressed. 90 KVA OUTPUT CABLE CONTACTORS OPEN lights 32 indicate when any of the 4 individual contactors are open by illuminating each light associated with an open contactor. 90 KVA OUTPUT CABLE CONTACTORS CLOSED lights 33 indicate when any of the 4 individual contactors are closed by illuminating each light associated with a closed contactor. 90 KVA OUTPUT CABLE CONTACTORS OVERCURRENT TRIP lights 34 indicate when any of the 4 individual contactors are tripped by illuminating each light associated with a tripped contactor. CONTACTOR ON/OFF/RUN switches 35 are each a three-position toggle switch, and they are used to open and close the 4 individual contactors. The switch must be held in the ON position for 5 seconds to close the contactor to supply output power to the load, and then when the switch is released it will return automatically to the RUN position. When switch is placed in the OFF position it will open the contactor and remain in the OFF position.

The above describes a prior art analog, electromechanical control panel in conjunction with a generator set in order to illustrate the analog display gauges, mechanical switches, and other electromechanical devices contained on such prior art analog control panels in general.

Also, attempts have been made at providing a digital controller for an electrical generator set. For example, Schultz et al, U.S. Pat. No. 5,168,208 provides for a microprocessor based, integrated control system for an electrical generator set.

SUMMARY OF THE INVENTION

Several problems exist with the prior analog, electro-mechanical control panels for generator sets and prior art digital control systems. One such problem with prior art control panels is that such control panels provide no preventive warnings to an operator prior to the occurrence of a problem. For example, prior art control panels may provide an out of fuel light. However, the out of fuel light may activate (i.e., illuminate) only after the generator runs out of fuel and shuts down (or just minutes before shutting down). Obviously, this is not a warning, but is just an after-the-fact indicator of what has already gone wrong. In this way, prior art control panels may provide an operator with an indication of why the generator is no longer operating, but prior art control panels offer no preventive warnings in an attempt to avoid a problem prior to its occurrence.

Moreover, the messages provided to operators of generator sets by prior art control panels are vague and cryptic. Prior art control panels do not provide clear, textual messages to communicate a warning or other condition to an operator. For example, a prior art control panel may provide a message to an operator in the form of an LED that illuminates on the control panel. Alternatively, prior art control panels may provide a cryptic textual message of a fault condition, such as "FAULT-13," which requires an operator to memorize the cryptic textual codes or spend time looking the message up in a technical manual. Some prior art control panels provide messages to an operator in the form of icons. For example, a rabbit may be displayed to alert the operator that the generator set's speed is too high. Such icons are often vague, and an operator may not understand what the icon represents unless the operator has memorized all of the icon messages or takes time to look up the icon in a technical manual.

Another problem with prior art control panels is that such panels do not provide interactive messages to an operator. Prior art control panels do not provide an operator with any guidance or suggestion as to what corrective or protective actions should be taken in response to a particular problem or condition. That is, an operator must monitor the prior art control panel, determine if a problem exists, and then determine what steps to take to correct or prevent a problem. Prior art control panels do not offer any guidance or suggestions to the operator as to what steps he/she should take to correct a problem or prevent a problem from occurring.

Another problem with prior art control panels is their inability to provide an operator with information about the initial cause of a particular problem. One problem on a generator set may trigger a sequence of resulting problems, and it may be difficult for an operator to determine the initial cause of the resulting sequence of problems. For example, a generator set may run out of fuel, which in turn may cause the cooling system to stop, which in turn may cause the water temperature to rise, which in turn may cause the generator set to overheat. With prior art control panels, an operator may be given indicators that the generator overheated and that it is out of fuel, but the operator is not given an indication of which problem was the initial cause of the sequence of problems.

Another problem in prior art control systems is that operators must monitor analog gauges and/or LEDs provided on the prior art control panels of the generator sets, rather than allowing operators to interface with the control system through user-friendly, configurable and selectable graphical displays. Another problem with prior art control panels is that all information provided to an operator must be provided at all times. Therefore, an operator constantly has many different gauges to monitor. Prior art control panels do not provide a way to hide certain gauges or certain information from an operator until it becomes important that the operator view such information. For example, a prior art control panel may have an oil pressure gauge displaying the set's oil pressure. Such oil pressure gauge is constantly displayed to an operator, and it may detract the operator's attention away from some other gauge that requires the operator's attention. Thus, there is no method in prior art control panels of displaying less than all of the information available at any given time. That is, there is no method in the prior art for displaying only a select few measurements at a given time on a generator set's control panel.

Additionally, there is no method in the prior art for displaying all information that an operator may desire to view simultaneously. For example, a prior art control panel for a 3 phase generator set will have a single analog meter for displaying output voltage and a single output meter for displaying output current. A switch will be provided on the generator set to allow an operator to choose which one of the 3 phases to view, and the output voltage and output current is displayed for only the chosen phase. Therefore, an operator has no method in the prior art of viewing all 3 phases simultaneously.

Another problem with prior art control panels is that they do not provide an operator with an easy-to-read, quick reference about the generator set's configurations. For example, a generator set may have a switch that allows an operator to configure the generator to run at 50 Hz or to run at 60 Hz operating speed. There may also be switches that allow an operator to configure the output voltage and the output power for the generator set. An operator has no easy method of determining operating parameters for which a particular generator is configured without checking each of the configuration switches.

Another problem in prior art control systems is that such systems are unable to automatically write a data file detailing output measurements and other information associated with the operation of the generator set. Rather, such logs must be kept manually, if at all, by operators of the generator sets. Because logs must be kept manually, the logs may not be kept up to date, they may contain inaccuracies, and they may not contain many important events occurring with the generator set. Therefore, such logs are often not as reliable, or dependable for supervisors, manufacturers or others who may desire to review the performance of a generator set and/or its operator(s).

Yet another problem with prior art control systems is that such systems fail to monitor mechanical switches and adjust the control systems operation according to such switches. One type of mechanical switches that may be provided on a generator set are configuration switches. For example, a generator set may have a switch that allows an operator to configure the set to operate at either 50 Hz or 60 Hz. Additionally, a wiring terminal board or a switch may be provided that allows an operator to configure the generator set's voltage to be either 120/208 VAC or 240/416 VAC. Prior art control systems do not monitor such mechanical devices and adjust the systems operation according to the devices. Rather, most prior art control systems are developed for a particular generator set and are not adaptable to other configurations. Therefore, prior art control systems are not adaptable to different generator configurations in real-time. To adapt prior art control systems to a different generator set configuration, set-up steps are required, such as physically changing components of the prior art control system. Prior art control systems do not monitor mechanical devices and do not adapt in real-time to different configurations of a generator set.

Another problem with prior art control panels is that they do not provide multiple levels of fault warnings. That is, prior art control panels cannot distinguish from a group of Set Points contained within a software program to determine severity. Additionally, prior art control panels do not take specific actions for a condition based on its level of severity. Finally, prior art control panels cannot convey relative severity to the operator. For example, a prior art control system may notify an operator when the fuel level falls to a certain level or when the output voltage increases to a certain level. Most prior art control systems set one level at which it may shutdown the generator set and notify an operator of each problem. A prior art control system may have a preset fault level of 300 VAC for output voltage, and when that level is achieved by the generator set the control system may shutdown the generator set and illuminate an LED notifying an operator that an over voltage condition occurred. Thus, prior art control systems do not provide multiple warnings having differing levels of severity for a monitored characteristic of the generator set.

A related problem with prior art control systems is that they do not provide warnings based upon multiple discrete parameter inputs. That is, prior art control systems take actions, such as shutting down the generator set, based upon a single input parameter. For example, a prior art control system may monitor a generator set's oil pressure and cause the generator set to shutdown if the oil pressure falls to a certain level. However, prior art control systems do not base the decision to shutdown the generator set on multiple discrete inputs, such as the oil pressure of the generator set, positions of mechanical switches on the generator set, and the length of time that a switch has been in a particular state on the generator set.

Another problem with prior art control panels is that there is no method of monitoring measurements on both sides of the output breaker and displaying the difference in voltage across the output breaker. That is, prior art generator sets only provide measurements of what is being output by the generator (i.e., what is coming out of the generator). Prior art generator sets do not provide any information about what the measurements are on the other side of the breaker (i.e., the "load side"). Some prior art control systems may prohibit an operator from closing an output breaker if a difference exists across the breaker, but the prior art control systems do not provide the operator with a measurement of the difference across a breaker. Such a measurement across the breaker would provide an operator with a tool that would allow an operator to determine whether and at what level the "load side" of an electrical distribution system is energized, and allow the operator to adjust the output of the generator accordingly. Such information may be useful in preserving the life of the output breaker and the generator set.

Another problem with prior art control panels is that they offer no method for monitoring or controlling a generator set remotely with a graphical user interface. That is, there is no method for an operator to graphically monitor the performance of a generator from a location that is remote to the generator set. Nor is there a method for an operator to interact with a generator set from a remote location in order to control the generator set through a graphical interface.

In view of the above, there exists a desire for a Digital Control System for monitoring and controlling generator sets. There is a further desire to provide a Digital Control System for monitoring and controlling generator sets that may provide preventive warnings to an operator of such generator sets prior to the occurrence of a problem. There is a further desire for a Digital Control System that may provide interactive messages to an operator of a generator set. There is a further desire for a Digital Control System that may provide information about the initial cause of a sequence of problems with a generator set. There is a further desire to provide a Digital Control System for monitoring and controlling generator sets that may provide an operator with guidance or suggestions as to what corrective or preventive actions should be taken in response to a particular problem or condition. There is a further desire to provide a Digital Control System that may offer an operator of a generator set a user-friendly, graphical display. There is a further desire to provide a Digital Control System that may provide an operator with an easy-to-read, quick view of the generator set's configuration settings.

There is yet a further desire to provide a Digital Control System that may write a data file detailing output measurements and other information associated with the operation of a generator set. There is a further desire to provide a Digital Control System that may provide a configurable display, such that certain information may be hidden from an operator by the Digital Control System until such time that the operator needs to view it, or all information that an operator desires to view may be displayed simultaneously.

There is yet a further desire for a Digital Control System that may adapt to differing configurations of a generator set in real-time. There is a further desire for a Digital Control System that may provide multiple level fault warnings having differing degrees of severity for a monitored characteristic of a generator set. There is also a desire for a Digital Control System that may provide warnings or take other protective or corrective actions based upon multiple discrete parameter inputs.

There is yet a further desire to provide a Digital Control System which may monitor and display the difference in voltage across a generator set's output breaker to aid an operator in paralleling generator sets. Furthermore, there is a desire to provide a Digital Control System which may allow a generator set to be monitored and/or controlled with a graphical user interface from a location remote to the generator set.

These and other objects, features and technical advantages are achieved by a Digital Control System ("DCS") that monitors the analog characteristics associated with a generator set (e.g., output voltage, output current, output power, fuel level, and oil pressure) as well as physical components of the generator set (e.g., mechanical switches and contactor), to control certain functions for the generator set and offer warnings to its operators. More specifically, a computer running a software program is provided to monitor the operation of a generator set and provide real-time information and/or warnings to an operator of the set. Additionally, the DCS may trigger certain events, such as shutting down the generator set, based on the monitored measurements reaching a particular level. In this way, the DCS not only monitors, but also controls the operation of the generator set. Furthermore, the DCS may acquire data about the performance of the generator set by writing such information to a data file.

In a preferred embodiment, the inventive DCS is used for a mobile generator set, such as generator set Model # Power Plus MEP-806B built by MCII, Inc., of Dallas, Tex. However, the inventive digital control and data acquisition system may be applied to other generator sets as well.

The DCS preferably includes a Microsoft Windows operating system, PC-based interface display. The system may include a variety of user-customizable interfaces, such as bar charts, numeric displays, analog displays, pie charts, and line charts. Moreover, a variety of diagnostics and maintenance information may be available to an operator from the digital display and control system. The DCS may acquire and display measurements, and it may provide users with real-time system status information and control for generator sets. It may be capable of accepting operator commands to adjust various generator parameters such as voltage and frequency. The DCS may be embedded within the control panel for a generator set. That is, an onboard, embedded computer may be available at the control panel. The DCS may be available at a site remote to the generator set to provide an operator at the remote site with a graphical interface for monitoring and controlling the generator set. For example, Ethernet connections may be used to make the DCS available at a remote site. Furthermore, the DCS may be available simultaneously at a local control panel and one or more remote sites.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 6A–6D show exemplary flow charts for the Digital Control System software.

DETAILED DESCRIPTION

Figure 2:
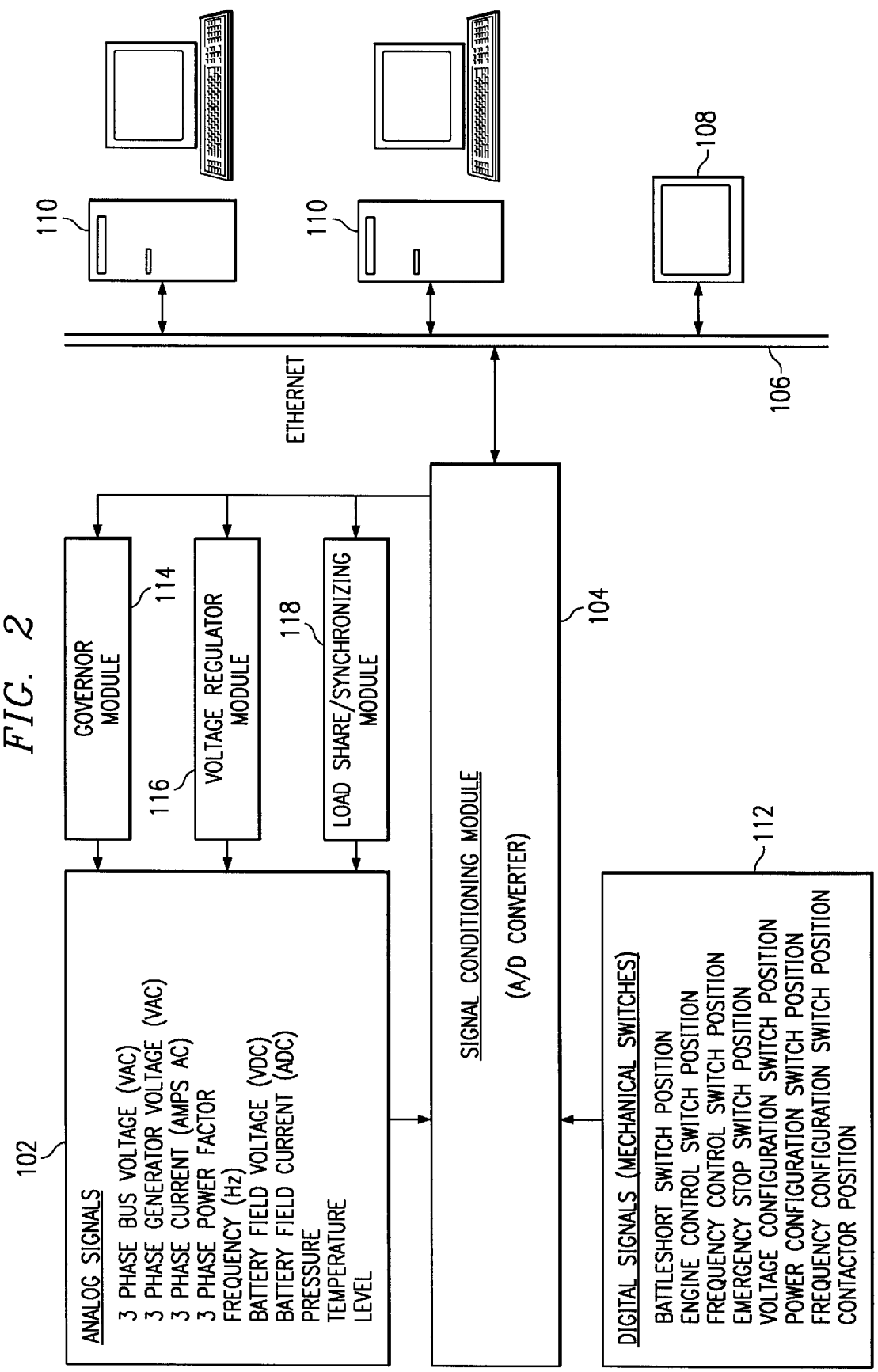
FIG. 2 shows an exemplary environment in which the Digital Control System may be implemented in block form.

The inventive Digital Control System (hereinafter "DCS") may acquire and display measurements to provide users with real-time system status information for generator sets (hereinafter "gen-sets"). The DCS may also control certain processes associated with a gen-set. Turning to FIG. 2, a system 100 in which the preferred embodiment of the DCS may be implemented is illustrated in block form. As shown, many types of analog signals 102 and digital signals 112 may be available to the DCS. Examples of such analog signals 102 include, but are not limited to, the following: 3 Phase Bus Voltage VAC (e.g., Phase A to Neutral, Phase B to Neutral, Phase C to Neutral, and Phase A to Phase B, Phase B to Phase C, and Phase A to Phase C); 3 Phase Generator Voltage VAC (e.g., Phase A to Neutral, Phase B to Neutral, and Phase C to Neutral); 3 Phase Generator Current Amps AC (e.g., Phase A to Neutral, Phase B to Neutral, and Phase C to Neutral); 3 Phase Power Factor (e.g., Phase A, Phase B, and Phase C); Generator Field Voltage (VDC); Generator Field Current (ADC); Battery Field Voltage (VDC); Battery Field Current (ADC); Generator Output Power (W); Frequency (Hz); Pressure (e.g., oil pressure); Temperature (e.g., coolant temperature); and Level (e.g., fuel level). Any one or more analog signal 102 may be conditioned or pass through the DCS. Such analog signals may be produced by governor module 114, Voltage Regulator Module 116 and Load Share/Synchronizing Module 118, as well as by other modules or components on the gen-set. Such analog signals represent analog characteristics of a gen-set.

Digital signals 112 are also supplied to the DCS, which allow the DCS to monitor mechanical switches and other components of the gen-set. Examples of the digital signals 112 that may be available to the DCS include, but are not limited to, the following: Battleshort switch position; Engine control switch position; Frequency control switch position; Emergency Stop switch position; Voltage Configuration switch position; Power Configuration switch position; Frequency Configuration switch position; and Contactor position.

One or more of the analog signals 102 and digital signals 112 are sensed and input to a signal conditioning module 104, which may include an analog-to-digital ("A/D") converter to convert the analog signals to digital signals capable of being processed by a computer. The resulting digital signals are then transmitted, preferably via Ethernet 106, to a Computer Interface Module ("CIM")108 and/or to one or more personal computers ("PCs") 110. CIM 108 and PCs 110 are computers which each may include a central processing unit (CPU), memory, a serial port, an input device, such as a keyboard and/or a mouse, and a display device, such as a computer monitor. CIM 108 is preferably integrated within the gen-set's control panel and preferably has a rugged design to allow CIM 108 to withstand harsh environment conditions which may be present at an operating site. Alternatively, AID converter 104 may interface with CIM: 108 and/or PCs 110 via other serial or parallel interfaces, or be physically located within CIM 108 and/or PCs 110 and communicate over a motherboard bus, such as a PCI bus. CIM 108 and PCs 110 are preferably running Microsoft Windows (such as Windows 98 or Windows NT).

CIM 108 and PCs 110 may display a measurement of each received analog signal 102 in a user-friendly, graphical interface. More specifically, CIM 108 and PCs 110 may execute a software program that receives signals from the signal conditioning module 104 and displays the various analog characteristics of a gen-set graphically and in real-time. The software program may also monitor and display the status of the various digital characteristics of the gen-set (e.g., mechanical switch positions and contactor position). Most preferably, the software program reads the digital signals fed to the Ethernet port of CIM 108 or PCs 110 from signal conditioning module 104, and the software program displays the signals as measurements in a graphical fashion in real-time. Accordingly, operators may observe the displayed measurements on CIM 108 and/or PCs 110.

Additionally, the software running on CIM 108 and/or PCs 110 may monitor the measurements and physical components of the gen-set (e.g., mechanical switches and contactor), and the software may control processes or perform other functions based on the measurement levels and/or state of such physical components. More specifically, CIM 108 and PCs 110 may execute a software program that monitors the received digital signals and performs preventive actions (e.g., displays status or protective warnings to an operator) or performs corrective actions (e.g., interacts with a relay circuit) based one or more signals' measurement levels. As illustrated in FIG. 2, the DCS software may also interact with other modules, such as Governor Module 114, Voltage Regulator Module 116, and Load Share/ Synchronizing Module 118 by sending signals through the Signal Conditioning Module 104 to further control operation of the gen-set.

Set Points may be contained within the software program for one or more of the received signals 102, against which the software may compare a signal's current measurement level to determine if an action needs to be taken. That is, Set Points may provide a reference level against which a signal's measurement may be compared. For example, CIM 108 may receive a fuel level signal via its serial port from A/D converter 104. The software running on CIM 108 may continually monitor the signals received from AID converter 104 and display the fuel level measurement graphically in real-time. Also, the software running on CIM 108 may have a Set Point of 20% for the fuel level, at which the software may cause a warning to be displayed for low fuel. That is, the software may monitor the received fuel level signal and display a warning when the fuel level falls to a certain level (e.g., 20%). Advantageously, multiple Set Points may be contained for a single signal. For example, an additional Set Point of 10% for the fuel level may be contained within the software, in response to which the software may cause a more critical message to be issued for low fuel.

Additionally, the software program may monitor the received signals and issue warnings or perform other functions based on particular conditions being true for multiple signals. For example, the software may cause the output breaker to open due to an over voltage situation. Before the software will attempt to open the breaker due to over voltage, two conditions may be required to be satisfied: 1) an over voltage situation exists, and 2) the output breaker is currently closed. Another example in which the software may issue a warning or perform a corrective function only if multiple conditions are true, is shutting down the gen-set due to a low oil pressure situation. Before the software may shutdown a gen-set due to low oil pressure, several conditions may be required to be true, such as: 1) the oil pressure is less than 20 pounds, 2) the gen-set is not in battleshort mode, and 3) the start switch has been in the run position for at least 20 seconds.

Because the DCS monitors both the electrical characteristics of a gen-set and the mechanical components of a gen-set (e.g., mechanical switches) the software can better determine exactly what is happening with the gen-set at any given time, and as a result, the software can better determine when to take a particular preventive and/or corrective action.

Figure 3:
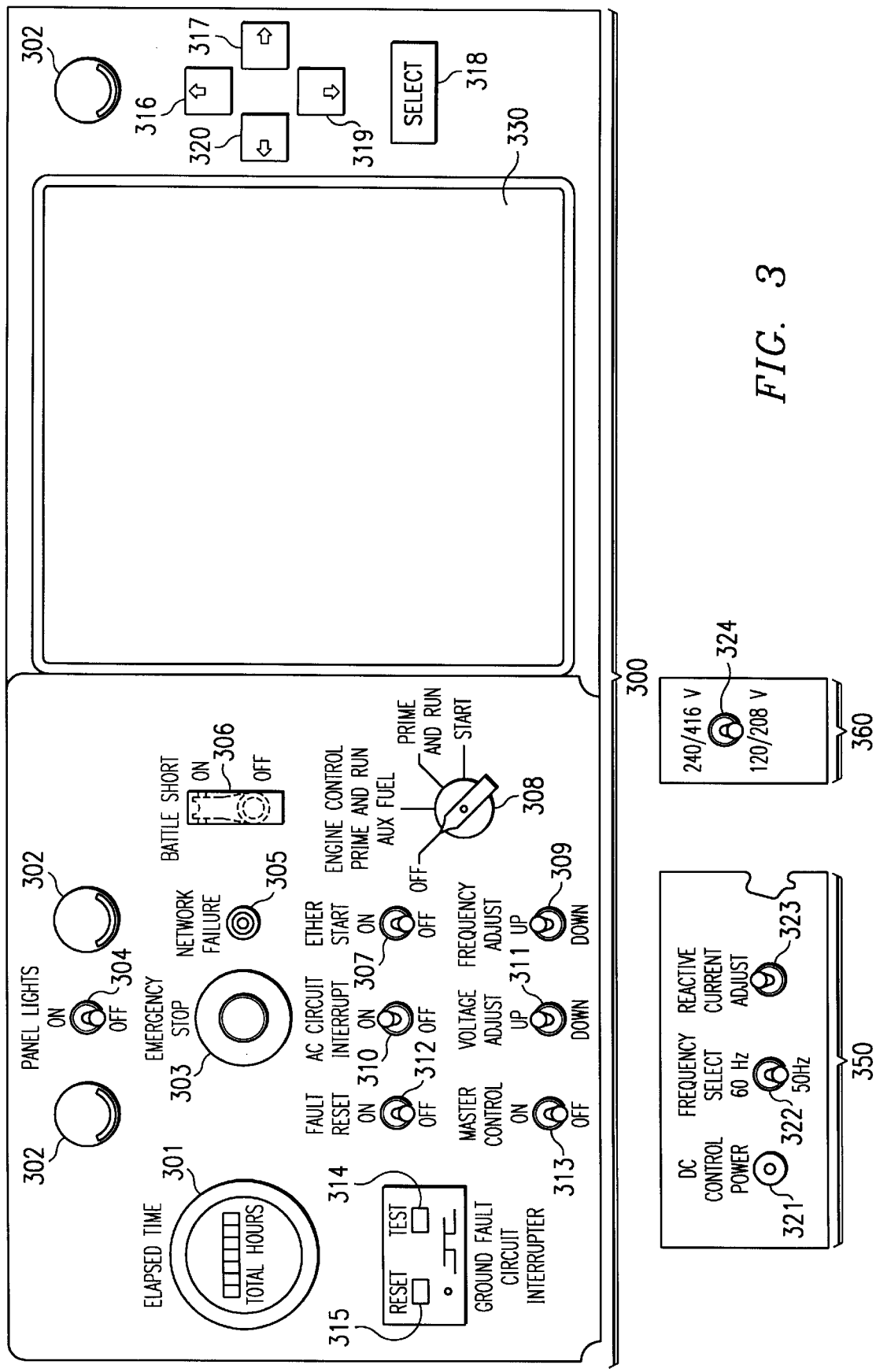
FIG. 3 shows a preferred embodiment for the Digital Control System being implemented within a generator set.

Most preferably, the DCS is utilized to monitor and control gen-set Model # Power Plus MEP-806B. Gen-set Model# Power Plus MEP-806B is a 3 phase set that may provide either 30 KW or 60 KW of power, either 120/208 VAC or 240/416 VAC of output voltage, and either 50 Hz, 60 Hz, or 400 Hz of output frequency. Turning to FIG. 3, a preferred embodiment of the inventive DCS being implemented for such a gen-set is shown. In this preferred embodiment, CIM 108 (shown in FIG. 2) is embedded within the gen-set's control panel 300. It should be noted that remote PCs 110 may be networked with the DCS for the gen-set, which would allow operators the ability to graphically monitor and/or control the gen-set from a remote location.

In addition to the DCS, the gen-set's control panel 300 may contain several mechanical switches and/or other electromechanical devices used for operating the gen-set. Exemplary electromechanical devices are shown in FIG. 3 to provide an illustration of how the DCS may interact with such devices. The devices shown are presently contained on the gen-set Model # Power Plus MEP-806B, but one or more of the electromechanical devices may be removed and have its function replaced by the DCS. The function of each exemplary electromechanical device shown will be discussed briefly hereafter to better illustrate the preferred embodiment of the DCS implemented in a gen-set. The control panel 300 contains several Panel Lights 302, which illuminate control panel 300 when activated. Panel Lights switch 304 activates and deactivates the Panel Lights 302. Elapsed Time meter 301 indicates the total engine operating hours for the gen-set, and Emergency Stop switch 303 shuts down the gen-set when activated. That is, Emergency Stop switch 303 removes electrical power to the gen-set's engine governor controller and stops the engine from operating.

Network Failure indicator 305 indicates a failure between the Computer Interface Module 330 and the Signal Conditioning Module (shown in FIG. 2) when it is illuminated. Most preferably, when Network Failure indicator 305 is illuminated, the gen-set will not continue to operate, because the capability to monitor its operation and to make adjustments may be degraded or lost. Battle Short switch 306 is used to bypass the protective devices on the gen-set. For example, when Battle Short switch 306 is placed in its ON position, the gen-set will continue to operate until over voltage occurs or fuel is exhausted. Ground Fault Circuit Interrupter Reset switch 315 resets the ground fault circuit interrupter. Ground Fault Circuit Interrupter Test switch 314 tests the ground fault circuit interrupter.

Fault Reset switch 312 resets (or "turns off") all fault indicators displayed on CIM display screen 330, and it will re-energize the governor power. AC Circuit Interrupt switch 310 opens and closes the AC Circuit Interrupt Relay (not shown), and is used during parallel operation. Ether Start switch 307, when held in its ON position momentarily during engine cranking, activates the ether cold weather starting system for starting the gen-set's engine at temperatures below 40 degrees Fahrenheit (4 degrees Celsius).

Master Control switch 313, when placed in its ON position, provides battery power to the DCS. This is typically the first switch activated on the control panel 300, and the gen-set typically cannot be started unless this switch is activated. Voltage Adjust switch 311 is a momentary-action toggle switch, and is used to adjust the voltage output of the gen-set. Voltage Adjust switch 311 works in both directions to increase and decrease the gen-set's output voltage. Likewise, Frequency Adjust switch 309 is also a momentary-action toggle switch. It adjusts the frequency output of the gen-set for each activation of the switch. Frequency Adjust switch 309 also works in both directions to increase and decrease the gen-set's output frequency.

Engine Control switch 308 is used to control the gen-set's engine and has 4 positions: (1) OFF, which de-energizes all circuits except the Panel Lights 302 and power to the CIM 330; (2) PRIME RUN & AUX FUEL, which energizes the gen-set run circuits with the auxiliary fuel pump operating; (3) PRIME & RUN, which energizes the gen-set run circuits with the auxiliary fuel pump de-energized; and (4) START, which energizes the engine starter and flashes the generator field.

Panel 350 and panel 360 may also be included somewhere within the gen-set. Typically, panels 350 and 360 are separate from the control panel 300. Panel 350 includes DC Control Power Circuit Breaker 321, Frequency Select switch 322 and Reactive Current Adjust 323. DC Control Power Circuit Breaker 321 energizes or de-energizes the DC circuits. Frequency Select switch 322 may allow selection of the operating speed of the gen-set, such as either 50 Hz or 60 Hz. Reactive Current Adjust 323 adjusts the voltage drop when two gen-sets are operated in parallel. Panel 360 includes Voltage Scale switch 324, which reports the configuration of the output voltage connection selected on the voltage reconnection terminal board.

As Illustrated in FIG. 3, in a preferred embodiment the DCS is embedded within the gen-set's control panel 300. The DCS includes an embedded computer having CIM display screen 330 located on the face of control panel 300. CIM display screen 330 is used to display information relating to the gen-set to an operator. Keypad Pushbuttons 316–320 may also be provided on the face of control panel 300 to allow an operator to interact with the DCS. Keypad Pushbuttons 316–320 are used to move a cursor on the CIN4 display screen 330 and to interact with the DCS. Keypad Up-Arrow Pushbutton 317 moves the cursor on the CIM display screen 330 in an upward direction until released or the cursor reaches the top of the screen. Keypad Right-Arrow Pushbutton 317 moves the cursor on the CIM display screen 330 to the right until released or the cursor reaches the right side of the screen. Keypad Down-Arrow Pushbutton 319 moves the cursor on the CIM display screen 330 in a downward direction until released or the cursor reaches the bottom of the screen. Keypad Left-Arrow Pushbutton 320 moves the cursor on the CIM display screen 330 to the left until released or the cursor reaches the left side of the screen. Keypad SELECT Pushbutton 318, when pressed, selects an item on the CIM display screen 330 indicated by the cursor.

Most preferably, Keypad Pushbuttons 316–320 are spaced apart relative to one another in a manner that allows an operator wearing gloves or mittens to easily interact with the DCS. That is, Keypad Pushbuttons 316–320 are most preferably spaced apart from one another at a distance that allows an operator wearing gloves or mittens to easily press one of the keypad pushbuttons without interfering with the other keypad pushbuttons. Such spacing of Keypad Pushbuttons 316–320 would be beneficial in that it allows an operator to interact with the DCS easily in harsh environments, in which an operator may be wearing heavy gloves or mittens (e.g., very cold weather conditions). However, in alternative embodiments Keypad Pushbuttons 316–320 may be arranged in any order and spaced in any manner and be within the scope of the present invention. Additionally, in alternative embodiments of the DCS, other input devices may be provided in place of the Keypad Pushbuttons 316–320 or in addition to Keypad Pushbuttons 316–320 to allow an operator to interact with the DCS. For example, an alphanumeric keyboard, and/or a mouse may be provided. Well known touch-screen technology may be utilized to allow an operator to interact with the DCS by touching a display screen, such as CIM display screen 330.

Figure 4:
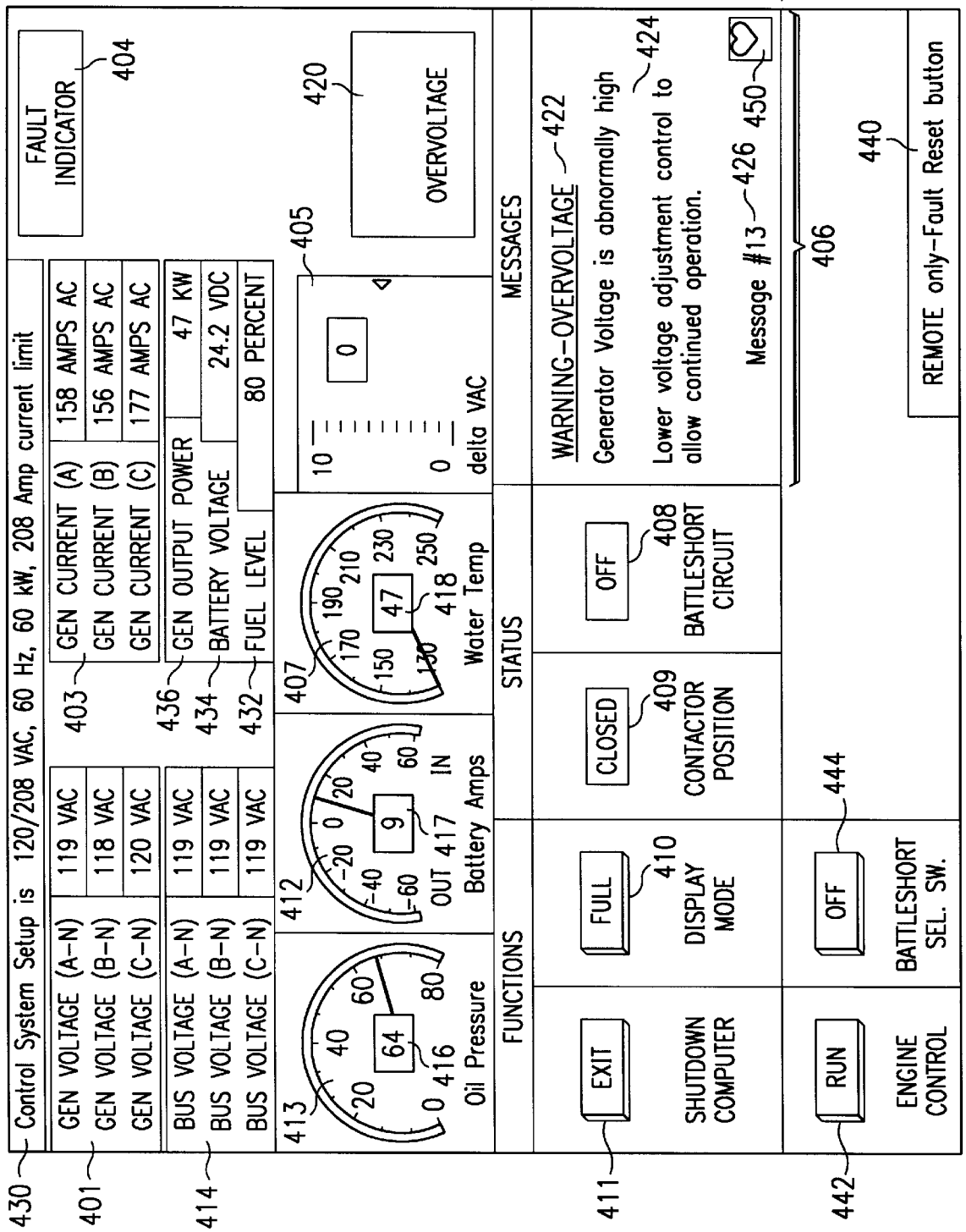
FIG. 4 shows an exemplary display screen that may be displayed in the preferred embodiment of the Digital Control System.
Figure 5:
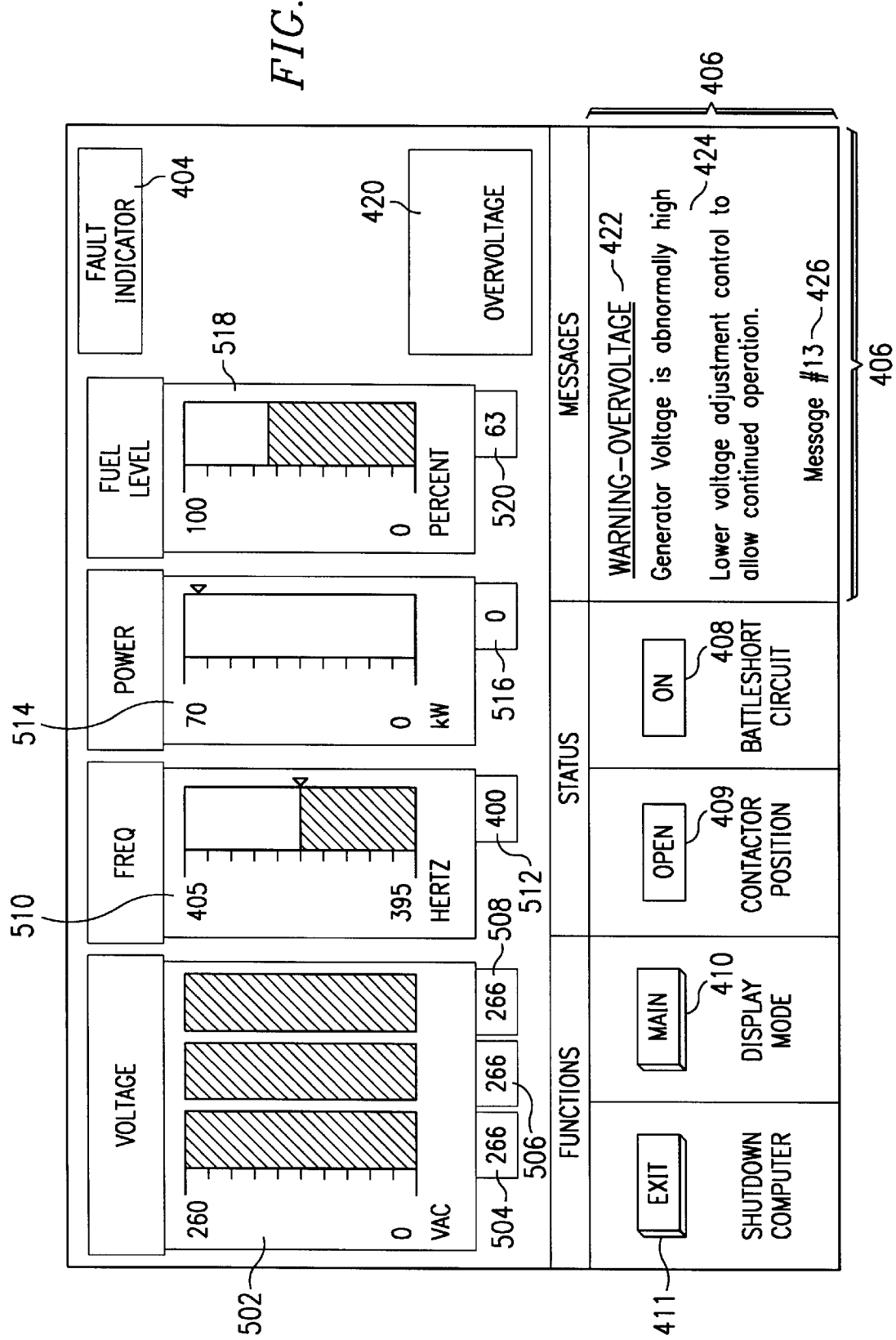
FIG. 5 shows another exemplary display screen that may be displayed in the preferred embodiment of the Digital Control System.

CIM display screen 330 may display measurements and other information relating to the gen-set. FIGS. 4 and 5 show examples of information that may be provided on CIM display screen 330. In a preferred embodiment, the CIM display screen 330 has at least 2 display modes. One such display mode may be what will be referred to as a "Full Display Mode," which may look similar to FIG. 4. Another display mode may be what will be referred to as a "Main Display Mode," which may look similar to FIG. 5. The Full Display Mode may provide many measurements and other information to an operator, and the Main Display Mode may provide only a select group of the more critical measurements and information to an operator. Therefore, an operator may obtain a more detailed view of a gen-set's performance in Full Display Mode, and an operator may obtain an easy-to-read view of only the more critical information in Main Display Mode.

Turning to FIG. 4, an exemplary screen view of CIM display 330 in Full Display Mode is shown. A configuration message 430 may be provided to detail the current configuration setting for the gen-set. For example, configuration message 430 may display the output voltage configuration (e.g., 120/208 VAC), the operating speed configuration (e.g., 60 Hz), the output power configuration (e.g., 60 KW), and the current limit for the gen-set (e.g., 208 Amp). Therefore, an operator can immediately determine the type of gen-set that he is viewing. GEN VOLTAGE indicators 401 indicate the output voltage for each of the 3 phases for the gen-set. Likewise, BUS VOLTAGE indicators 414 indicate voltage on the output bus for each of the 3 phases.

GEN CURRENT indicators 403 indicate the output current (amps) for each of the 3 phases for the gen-set. GEN OUTPUT POWER indicator 436 indicates the output power (KW) for the gen-set. BATTERY VOLTAGE indicator 434 indicates the charge status of both gen-set DC batteries (VDC). FUEL LEVEL indicator 432 indicates the fuel level (percentage) for the gen-set. OIL PRESSURE virtual meter 413 indicates the engine oil pressure (psi). BATTERY AMPS virtual meter 412 indicates the input current of the gen-set DC batteries (amps). WATER TENT virtual meter 407 indicates the cooling system water temperature (in Fahrenheit).

DELTA VAC gauge 405 indicates the output voltage versus bus voltage. This is an operator aid that may be used prior to operating in parallel with another unit to monitor the system to ensure that the gen-set's output voltage and the bus voltage are balanced to a particular degree before closing the contactor to the bus. Most preferably, the output voltage and bus voltage should be balanced within 5 volts before closing the contactor to the bus, and the DCS software may not allow the contactor to be closed until this is achieved.

Most preferably, virtual meters 413, 412 and 407 include both a virtual analog meter and a numeric display, such as numeric displays 416, 417 and 418. Most preferably, DELTA VAC gauge 405 includes both a bar graph and a numeric display to show its corresponding measurement. Most preferably, GEN VOLTAGE indicators 401, BUS VOLTAGE indicators 414, GEN CURRENT indicators 403, GEN OUTPUT POWER indicator 436, BATTERY VOLTAGE indicator 434, and FUEL LEVEL indicator 432 include numeric displays to show their corresponding measurement information. However, the measurement information may be displayed in a variety of ways utilizing various graphical display tools. For example, any one or more of the measurement displays may include a virtual meter, a bar graph, a line chart, a pie chart, a numeric display, or any combination of such graphical display tools.

The portion of the display screen labeled as "FUNCTIONS" contains SHUTDOWN COMPUTER EXIT button 411 and DISPLAY MODE FULL/MAIN button 410. SHUTDOWN COMPUTER EXIT button 411, when selected, shuts down the DCS software so that the CIM can be safely deactivated. Most preferably, selecting SHUTDOWN COMPUTER EXIT button 411 may also shut down the gen-set if it is running. DISPLAY MODE FULL/MAIN button 410 toggles between FULL and MAIN display modes when selected.

The portion of the display screen labeled as "STATUS" contains CONTACTOR POSITION status indicator 409 and BATTLE SHORT CIRCUIT status indicator 408. CONTACTOR POSITION status indicator 409 indicates whether the contactor is open or closed. BATTLE SHORT CIRCUIT status indicator 408 indicates whether the gen-set is in battle short mode or not. An ON indication means that the battle short circuit is energized.

Additionally, ENGINE CONTROL button 442 may be provided to allow an operator to control the engine of the gen-set through the software interface. Most preferably, this button is provided only for remote operators because remote operators do not have access to a mechanical engine control switch that may be provided on the gen-set's control panel. Also, BATTLESHORT SWITCH 444 may be provided to allow an operator to place the gen-set in battleshort mode or remove a gen-set from battleshort mode through the software interface. Most preferably, this button is provided only for remote operators because remote operators do not have access to a mechanical battleshort switch that may be provided on the gen-set's control panel. Moreover, a FAULT RESET button 440 may be provided to allow an operator to reset or clear the fault messages through the software interface. Most preferably, this button is provided only for remote operators because remote operators do not have access to a mechanical fault reset switch that may be provided on the gen-set's control panel.

The heart icon 450 may be provided to indicate when the DCS software is operating (i.e., the CPU is executing the software program). The heart icon 450 may blink or pulse to indicate that the DCS software is "alive" and executing to perform monitoring and other tasks. Thus, if the DCS CPU is not executing the software program, the heart icon 450 may stop blinking or it may disappear completely from the display screen. Other indicators may be used instead of a heart icon to indicate when the DCS software program is functioning properly and still be within the scope of the present invention.

FAULT INDICATOR display 404 is a title bar for the Fault Summary area 420. Preferably, FAULT INDICATOR display 404 is always present on the CIM display screen 330 to provide a title for the Fault Summary area 420.

Fault Summary area 420 provides brief descriptions of fault events as they occur. That is, Fault Summary area 420 provides indicators having summarized messages (e.g., "OVER VOLTAGE") and may only be present on the CIM display screen 330 when a fault event has been detected. Fault Summary area 420 is a visual indicator to put an operator on notice that a fault event has been detected. When no fault events have been detected, the Fault Summary area 420 indicators are not visible. Summarized descriptions in the Fault Summary area 420 indicators may be provided for any type of fault event delineated in the software programming. For example, Low Fuel Level or Over Voltage conditions may be detected by Set Points contained within the software, thereby initiating a corresponding summarized notification in the Fault Summary area 420.

Summarized descriptions appearing in the Fault Summary area 420 may be interpreted by the operator to communicate the severity of an event. For example, Low Fuel Level events may initially periodically flash on and off to provide notice to the operator that an abnormal (but not urgent) fuel level condition exists. If this condition is not corrected, and fuel level lowers further, the displayed indication may cease flashing and appear continuously solid. A solid indication may signify a more serious condition, typically corresponding to an automatically initiated protective action such as engine shutdown or output contactor trip. In an alternative embodiment, the Fault Summary area 420 indicators may be divided into separate areas based on the severity of the fault detected. For example, severe faults that may require an engine shutdown may be displayed in an upper portion of the CIM display screen (e.g., directly below FAULT INDICATOR display 404), and less severe faults may be displayed in a lower portion of the CIM display screen.

Turning now to the portion of the display screen labeled as "MESSAGES," Detailed Message area 406 displays specific warnings and instructions related to a fault event. A message is displayed in Detailed Message area 406 simultaneously with an indicator in Fault Summary area 420 when a fault event is detected. That is, Detailed Message area 406 displays warnings and instructions in the form of detailed operator messages related to faults indicated in the Fault Summary area 420. An example is shown in FIGS. 4 and 5 for an "over voltage" fault being detected. Accordingly, Fault Summary area 420 indicator is present on CIM: display screen 330, which alerts an operator that a fault event has been detected. The Fault Summary area 420 indicator indicates "OVER VOLTAGE," which alerts the operator that the detected fault event relates to an over voltage problem. Detailed Message area 406 provides a more specific description of the fault, suggests action to be taken by the operator, and provides a cross-reference number for the operator, which may correspond to a technical manual reference.

Turning to FIG. 5, the "Main Display" screen is shown, on which lesser detail is provided by limiting the display to only a few of the more important measurements. An operator may switch from the Full Display Mode to this Main Display Mode by selecting Display Mode button 410. In true operation the measurements displayed would correspond between the two display modes at any given time, even though they may not necessarily correspond as shown in FIGS. 4 and 5 (e.g., the voltage output would be displayed as the same output level on either screen at any given time). Also, the Fault Summary area 420 and Detailed Message area 406 may not actually correspond to the displayed values shown in FIGS. 4 and 5 (e.g., the output voltage level shown may not generate an OVER VOLTAGE WARNING), rather Fault Summary area 420 indicators and Detailed Message area 406 are shown to illustrate an example of how they may appear upon detection of a true fault. Most preferably, Display Mode button 410 indicates the mode currently being viewed. Accordingly, when the CIM display 330 is in Full Display Mode, Display Mode button 410 is labeled as "FULL" (as shown in FIG. 4), and when the CIM display 330 is switched to the Main Display Mode, the label for Display Mode button 410 changes to "MAIN" (as shown in FIG. 5).

It should be noted that for this preferred embodiment the "FUNCTIONS" 410 and 411, "STATUS" 408 and 409, Detailed Message area 406, "FAULT INDICATOR" display 404, and Fault Summary area 420 portions of the display do not change between the Full Display Mode and the Main Display Mode. Rather, these areas of the display are preferably fixed and do not change from screen to screen. When a change is made from the Full Display Mode to the Main Display Mode, only the remaining portions of the display screen are changed to display a select group of important measurements in an easy-to-read, user-friendly, graphical interface.

VOLTAGE gauge 502 indicates the output (VAC) for each phase for the 3 phase gen-set. FREQ gauge 510 indicates the gen-set's frequency output (Hz). POWER gauge 514 indicates the gen-set's power output (kW), and FUEL LEVEL gauge 518 indicates the percentage amount of fuel remaining in the fuel tank. Most preferably, each gauge includes bar graphs as shown in FIG. 5. Most preferably each gauge 502 also includes a numeric display of the measurements, such as displays 504, 506, 508, 512, 516 and 520. The bar graphs and numeric displays aid an operator in reading the measurements easily, correctly, and quickly. However, the measurement information may be displayed in a variety of ways utilizing various graphical display tools to provide an operator with an easy-to-read graphical display. For example, any one or more of the measurement displays may include a virtual meter, a bar graph, a line chart, a pie chart, a numeric display, or any combination of such graphical display tools.

As illustrated in the exemplary screen display shown in FIG. 5, the output voltage, output frequency, output power, and fuel level may be the only measurements shown in Main Display Mode. These measurements may be shown because they represent the most important generator operating characteristics to an operator, and will therefore likely be viewed most often by an operator. Moreover, these measurements are provided in a graphical manner that makes it easy for an operator to evaluate the performance of the gen-set quickly.

The software may provide multiple levels of fault warnings indicating differing levels of severity. For example, the software may provide a "high out of range warning," a "high warning," a "low warning," and a "low out of range warning." The "high warning" level and the "low warning" level may be divided into further levels of warnings indicating differing degrees of severity. For example, a "high warning" may be provided at a certain level and a more severe "shutdown message" may be provided at a higher level. The software may monitor the received signals relating to the analog and digital characteristics of the gen-set, and compare the signals with a preset "Set Point" to determine whether a fault event is detected.

There are many types of events that may be considered "FAULT" events within the DCS, and thereby trigger Fault Summary area 420 indicators and Detailed Message area 406 messages. Examples of events that may be considered a fault along with detailed messages (displayed in Detailed Message area 406) that may accompany each exemplary fault event are provided hereafter. A "CIRCUIT FAILURE—FUEL LEVEL" fault may be provided when the fuel level signal is outside the operating range. If the fuel level signal is lower than the operating range, Detailed Messages area 406 may provide: "The fuel level signal is lower than the operating range. Check fuel level. Check fuel sensor and circuit." If the fuel level signal is higher than the operating range, Detailed Messages area 406 may provide: "The fuel level signal is higher than the operating range. Check fuel level. Check fuel sensor and circuit." A "SHUTDOWN—LOW FUEL" fault may be provided when the fuel level is abnormally low. The Detailed Messages area 406 may provide: "Fuel level is abnormally low. Check fuel level. Verify fuel system lineup." A "WARNING—LOW FUEL" fault may be provided when the fuel level is abnormally low. The Detailed Messages area 406 may provide: "Fuel level is abnormally low. Check fuel level. Verify fuel system lineup."

A "CIRCUIT FAILURE—COOLANT TEMPERATURE" fault may be provided when the coolant temperature signal is outisde the operating range. If the coolant temperature signal is lower than the operating range, Detailed Messages area 406 may provide: "The coolant temperature signal is lower than the operating range. Check coolant level. Check coolant temperature sensor and circuit." If the coolant temperature signal is higher than the operating range, Detailed Messages area 406 may provide: "The coolant temperature is higher than the operating range. Check coolant level. Check coolant temperature sensor and circuit." A "WARNING—COOLANT TEMPERATURE" fault or a "SHUTDOWN—COOLANT TEMPERATURE" fault may be provided when the coolant temperature is abnormally high. Detailed Messages area 406 may provide: "Coolant temperature is abnormally high. Check coolant level. Verify coolant system lineup."

A "CIRCUIT FAILURE—OIL PRESSURE" fault may be provided when the oil pressure signal is outside the operating range. If the oil pressure signal is lower than the operating range, Detailed Messages area 406 may provide: "The oil pressure signal is lower than the operating range. Check oil pressure. Check oil pressure sensor and circuit." If the oil pressure signal is higher than the operating range, Detailed Messages area 406 may provide: "The oil pressure signal is higher than the operating range. Check oil pressure. Check oil pressure sensor and circuit." A "WARNING—LOW OIL" fault or a "SHUTDOWN—LOW OIL" fault may be provided when the oil pressure is abnormally low. Detailed Messages area 406 may provide: "Oil pressure is abnormally low. Check oil pressure. Verify lubricating system lineup."

A "WARNING—OVERVOLTAGE" fault or a "SHUTDOWN OVERVOLTAGE" fault may be provided when the generator's output voltage is abnormally high. Detailed Messages area 406 may provide: "Generator voltage is abnormally high. Adjust VOLTAGE ADJUST switch." A "WARNING— UNDERVOLTAGE" fault or a "CONTACTOR TRIP—UNDERVOLTAGE" fault may be provided when the gen-set's output voltage is abnormally low. Detailed Messages area 406 may provide: "Generator voltage is abnormally low. Adjust VOLTAGE ADJUST switch."

A "WARNING—OVERSPEED" fault may be provided when the generator frequency is abnormally high. Detailed Messages area 406 may provide: "Generator frequency is abnormally high. Adjust FREQUENCY ADJUST switch." A "WARNING—OVERLOAD" fault or a "CONTACTOR TRIP—OVERLOAD" may be provided when the generator's load is abnormally high. Detailed Messages area 406 may provide: "System load is abnormally high. Reduce load to within generator set ratings." A "CONTACTOR TRIP—REVERSE POWER fault may be provided when a load share device senses a reverse power condition. Detailed Messages area 406 may provide: "Load share device sensed reverse power conditions. Verify load share device setpoints are correct." A "CONTACTOR TRIP—SHORT CIRCUIT" fault may be provided, and Detailed Messages area 406 may provide: "System load was abnormally high. Reduce load to within generator set ratings."

The DCS offers many features not available with the prior art analog, electromechanical control/display devices or the prior art digital control systems for gen-sets. One exemplary feature that the DCS may offer that is not available with prior art control/display devices is the ability of the DCS to provide interactive messages to an operator. Most preferably, the DCS software provides a textual message that is composed of a title, a body, and a reference number. Referring now to FIGS. 4 and 5, a title 422, a body 424, and a reference number 426 are shown in the Detailed Message area 406 portion of the screen. The title of the message may inform the operator of the severity of the message, such as whether it is a warning or a shutdown message, and it may describe the type of fault event that generated the message. For example, a title may provide, "WARNING—OVER VOLTAGE" (as shown in FIGS. 4 and 5).

The body of the message may provide a more detailed description of the fault that generated the message, and it may suggest some actions to be taken in response to the message. For example, the body of a message may provide, "Generator voltage is abnormally high. Adjust VOLTAGE ADJUST switch" (as shown in FIGS. 4 and 5). The reference number may be a number in the page of a technical manual that addresses the particular fault condition reported or that addresses how to perform some of the actions that have been suggested by the body of the message. For example, the reference number may provide, "REFERENCE # 2–38," which may direct an operator to chapter 2, page 38 of a technical manual.

In an alternative embodiment, a technical manual may be provided on-line for the DCS computer. This may allow an operator to display pages of the technical manual on the DCS display screen. Additionally, a form of hypertext links may be included within a message to allow an operator to display information from the on-line technical manual related to the displayed message. Continuing with the previous example, "REFERENCE #2–38" may be a hypertext link that an operator may select to view chapter 2, page 38 on-line.

Many prior art control systems merely display vague, non-descriptive messages. One example of such a prior art message is a light emitting diode (LED) that illuminates when a particular fault is detected, such as OVERHEAT light 109 shown in FIG. 1. Another example of a prior art message is a vague message that may provide simply a fault number, such as "FAULT 13." For such a fault number message, an operator must either memorize the fault numbers or look up the particular fault number in a technical manual to determine what fault condition is being reported.

Many control systems display only graphical icons to indicate warning messages. However, it is more desirable to have a textual message as opposed to only displaying a graphical icon for a warning because the textual message offers much more information-than an icon. For example, an icon warning displaying a rabbit may be used to indicate that the operating speed of a gen-set is too fast. However, this is much more cryptic than a textual message that provides: "Generator frequency is abnormally high. Adjust FREQUENCY ADJUST switch." With the graphical icon, an operator must either know what the icon symbolizes or look it up in a user manual, which may cause lengthy unnecessary delays during the time that the gen-set requires immediate action by the operator. Thus, a graphical icon is vague and does not provide a clear description of the fault condition as does a textual message.

Moreover, the prior art methods for displaying messages do not offer any suggestions about how to correct or react to the reported fault condition, as may be provided with a descriptive textual message. That is, prior art messages do not suggest or recommend any particular actions for an operator to take in response to the reported fault condition. As shown in FIGS. 4 and 5, an example of a suggested action for an operator to take for an OVER VOLTAGE WARNING is "Lower voltage adjustment control to allow continued operation." Additionally, a reference to the technical manual is provided that allows an operator to quickly obtain even more information about the reported fault condition. Such a recommendation may include only an action to take that is most likely to resolve the fault condition. Alternatively, multiple recommendations may be provided by the software. For example, in response to a LOW FUEL LEVEL WARNING the software may provide "(1) Check/Add Fuel; (2) Verify Fuel System Lineup; (3) Check Fuel Sensor and Circuit." The recommendations may be ordered from the action that is most likely to resolve the reported fault condition to the action that is least likely to resolve the condition. By providing the operator with some suggestion or recommendation about how to address a reported fault condition and providing the operator with a specific reference to the technical manual regarding the reported fault condition, the DCS software increases the likelihood that an operator will resolve a reported fault condition quickly and efficiently.

In the preferred embodiment, an operator can clear a message from the Detailed Message area 406 using a toggle switch, such as Fault Reset switch 312 shown in FIG. 3. Additionally, remote operators may be provided with a software button for clearing the Detailed Message area 406, such as FAULT RESET button 440 shown in FIG. 4 (since remote operators are not in a position to interact with the physical switches on the gen-set's control panel). In the preferred embodiment, a detailed, informational "help message" may be presented to the operator. Such detailed messages may be accumulated one on top of the other in a Detailed Message area 406 on the DCS display screen. For example, the most recent message received may be the top message (e.g., the message currently displayed on the DCS screen). Prior event messages may be just below the top message, but not visible to the operator. Detailed messages may be cleared from the Detailed Message area 406 when the operator toggles the FAULT RESET button 440.

As an example, consider the following sequence of events: assume that a generator set is overheating. The DCS may initially display a detailed message in Detailed Message area 406 which warns of "abnormal conditions" (High Engine Coolant Temperature) and advising the operator to verify load conditions. After reading this detailed message, the operator may "clear" it using the FAULT RESET button 440, removing all information from the Detailed Message area 406. If the overheating problem remains uncorrected and a second Set Point is reached, another detailed message may inform the operator that a protective action was automatically initiated, such as "Engine Shutdown due to high coolant temperatures. Verify coolant system lineup and coolant flow available prior to restarting the engine." After reading this detailed message, the operator may "clear" it using the FAULT RESET button 440, removing all information from the Detailed Message area 406. However, if the operator does not toggle the FAULT RESET button 440, and a subsequent event is detected (for example, low oil pressure), then the subsequent event is displayed as the top message. The High Temperature message is not visible to the operator. Finally, depressing the FAULT RESET 440 button may remove all information from the Detailed Message area 406.

Preferably, the software may display a single FAULT SUMMARY area 420 message corresponding to the initial fault event detected and suppress subsequent fault messages. Suppressing subsequent FAULT SUMMARY area 420 messages may assist an operator in determining the initial cause of the problem. For example, if a gen-set has overheated and shutdown, many messages may be generated. However, if all messages are displayed, it would be difficult to determine the initial cause of the problem. The DCS system will preferably display only the initial message, which would allow an operator to determine the initial cause of a problem.

Continuing with the example of a generator that overheated and shutdown, the DCS may only display a message that the system was out of fuel. From this an operator may be able to deduce that running out of fuel was the initial problem which may have caused the cooling to shutdown causing the water temperature to rise. Such a method of providing "initial only messaging" is a feature not available with prior art control systems. Prior art systems typically report fault conditions by illuminating all LEDs or displaying graphical icons, without any indication as to the order in which the fault conditions were reported.

Another exemplary feature that the DCS may offer that is not available with the prior art control/display devices is the ability of the DCS software to write an informational data file. Most preferably, the data file is a First In, First Out ("FIFO") data file capable of storing at least 4,000 entries. The software may write a variety of information to such a data file. Most preferably, the software writes information in the form of a captionated sentence which includes the following information: Date/Time, Engine Elapsed Time, Measurements at the time of the file write (such as 3 phase voltage, 3 phase current, KW power factor frequency, battery condition, and oil pressure), and special comments.

The Date/Time portion of a data entry may provide the actual date and time that the data entry was written. The Engine Elapsed Time portion may provide the amount of time, preferably in hours, minutes and seconds format, that the control system has been energized since assembly. The Engine Elapsed Time portion of a data entry may be desirable for manufacturers and operators to determine any trends for problems that arise in gen-sets after a certain amount of energized time. Also, this information may allow manufacturers to limit warranties on a gen-set to only a specified amount of energized time, and this data file may allow manufacturers to determine whether a problem arose within the time covered by warranty. The "special comments" portion of the data file may include any warnings or faults that have been detected, such as "low oil pressure warning" or "low fuel level shutdown."

Most preferably, the DCS software may write such information to the data file on two occasions. The first occasion on which the software may write to the data file is merely a periodic write, such as once an hour. That is, the software may write information to the data file once an hour, as long as the gen-set control system is energized. This allows the DCS to record all of the measurements instantaneously on a periodic basis. Such measurements may be written to the data file regardless of whether the gen-set is actually generating voltage at the time of an entry to the data file. As long as the computer is energized, the periodic file may be written. The data file may provide a background device or a supervisory tool so that information about a gen-set may be later retrieved and reviewed. This may be done for supervisory purposes to evaluate the performance of operators of the gen-set. It may also allow manufacturers of the gen-set to monitor the operation of the gen-set in order to evaluate the set's performance and/or to determine whether certain warranty conditions on the set have been violated by its operator(s).

The second occasion on which the DCS software may write to the data file is upon the happening of a specified event, such as any fault event within the gen-set. For example, detecting a low oil pressure condition or detecting an over voltage condition may cause the software to write an entry to the data file. Additionally, starting or stopping the gen-set control software program may each cause the software to write an entry to the data file. Most preferably, an entry is only written once per fault event (or once per "offense"). In other words, suppose that a fault event is generated when the fuel level falls to 30%. When the fuel level falls to 30%, a data file entry may be written recording Date/Time, Engine Elapsed Time, Measurements at the time of the file write, and special comments (such as "fuel level warning"). However, if the fuel level continues falling to 29%, most preferably a second data file entry is not written for this "continued offense." It should be noted that if an operator clears the fault message, such as by toggling the Fault Reset switch 312 shown in FIG. 3, while the fault condition still exists (e.g., the fuel level is still below 30%, then the DCS may detect this fault condition and generate a second fault message and may cause a second entry to be written to the data file.

The data file is preferably a FIFO data file, but may be any type of file utilizing any known method of storing and retrieving data entries. Preferably, each data entry to the file contains Date/Time, Engine Elapsed Time, Measurements, and special comments. However, each entry may contain less information or even more information relating to a gen-set. Most preferably, each data file entry is a joined sentence of the above-mentioned components, which resides on the hard drive of the DCS computer. Most preferably, the data file is retrievable under normal operations of the gen-set, without requiring the set to be shut down prior to retrieving the file. The data file may be retrieved and copied while the gen-set is running, without impacting the set. Such a retrieval may be accomplished utilizing "Direct Cable Connection" available with Windows 95. That is, a user may connect a laptop to the serial port on the DCS computer and retrieve the file without impacting the gen-set. Alternatively, the data file may be retrieved utilizing known methods of retrieval, including: printing the file to a printer, displaying the file to a screen, copying the file to a disk, and retrieving the file at a remote PC.

Such a data file may be used to supplement or replace logs that are often kept manually by gen-set operators. Such a file may be more consistent, comprehensive, and accurate than logs kept manually by operators. That is, the data file may be written both periodically and upon the occurrence of a fault condition. This may be a more consistent recording system than logs kept manually by gen-set operators. Operators may forget to make a periodic entry and operators may not observe or record the occurrence of each fault condition. Additionally, the data file may contain more information than is normally recorded by gen-set operators. Furthermore, logs kept manually by gen-set operators are susceptible to human error by the operator keeping the log. Therefore, the data file may be more accurate than a log kept manually by an operator.

Another exemplary feature that the DCS may offer that is not available with the prior art control systems is the ability of the DCS to provide a user-friendly, graphical display. That is, information relating to the gen-set's performance is displayed in an easy-to-read fashion utilizing bar graphs, numeric displays, virtual meters, and other graphical tools. Displaying information in such a graphical manner allows an operator to evaluate the performance of a gen-set in an easier, quicker, more efficient, and more reliable manner. For example, a gen-set's voltage output level for each of the 3 phases may be displayed with 3 bar graphs, as shown in FIG. 5. Thus, an operator can view the bar graphs and quickly evaluate the level for all 3 phases. Moreover, a numerical display may be easier for the operator to evaluate than an analog meter, which in turn may result in more precise readings by the operator.

Additionally, a sentence may be provided on the graphical display that details the configuration of the gen-set. For example, a sentence such as configuration sentence 430 shown in FIG. 4 may be provided. Such a "configuration sentence" may detail the output power, output voltage and output current configurations of the gen-set. Thus, an operator can quickly and easily determine the type of gen-set being viewed.

Another exemplary feature that the DCS may offer that is not available with the prior art control/display devices is the ability of the DCS to provide a configurable, optional display, that may hide selected information from the operator or display all desired information simultaneously to the operator. All of the metering and other information may not be present on the DCS display screen at all times. Rather, some of the metering and other information may be running in the background and not displayed on the DCS display. For example, a warning message that the fuel level is low may be presented on the DCS display. However, once the corrective measures are taken and the warning message is no longer required, it may be cleared from the DCS display. Another example may include help information that may be presented on the DCS display upon demand by an operator and then cleared from the DCS display when no longer needed. With the prior art control/displays all metering and other information were presented to an operator at all times.

Another example of information always present on prior art control panels that may only be present at select times using the DCS control system is meters, such as the oil pressure meter. As illustrated in FIG. 4, the oil pressure (indicated by oil pressure meter 413) may be presented to an operator when the DCS display screen is in Full Display Mode. However, as illustrated in FIG. 5, the oil pressure may be absent from the DCS display screen when in Main Display Mode. In an alternative embodiment, the oil pressure may be presented on the DCS display screen only when it reaches a level at which the operator needs to view it. Other measurement gauges may be displayed in a similar manner.

By only displaying certain information at select times, the DCS control system may conserve screen space on the control panel. Additionally, an operator's attention is more likely to be drawn to something on the screen that is not always present. For example, an operator is more likely to notice an oil pressure meter that is present on the screen if such oil pressure meter is only present at select times. Also, an operator may only be shown what is important or critical for normal operation of the gen-set. Moreover, by only displaying certain information at select times, the screen may be less cluttered, which may allow the screen to be easier for an operator to read.

Figure 1:
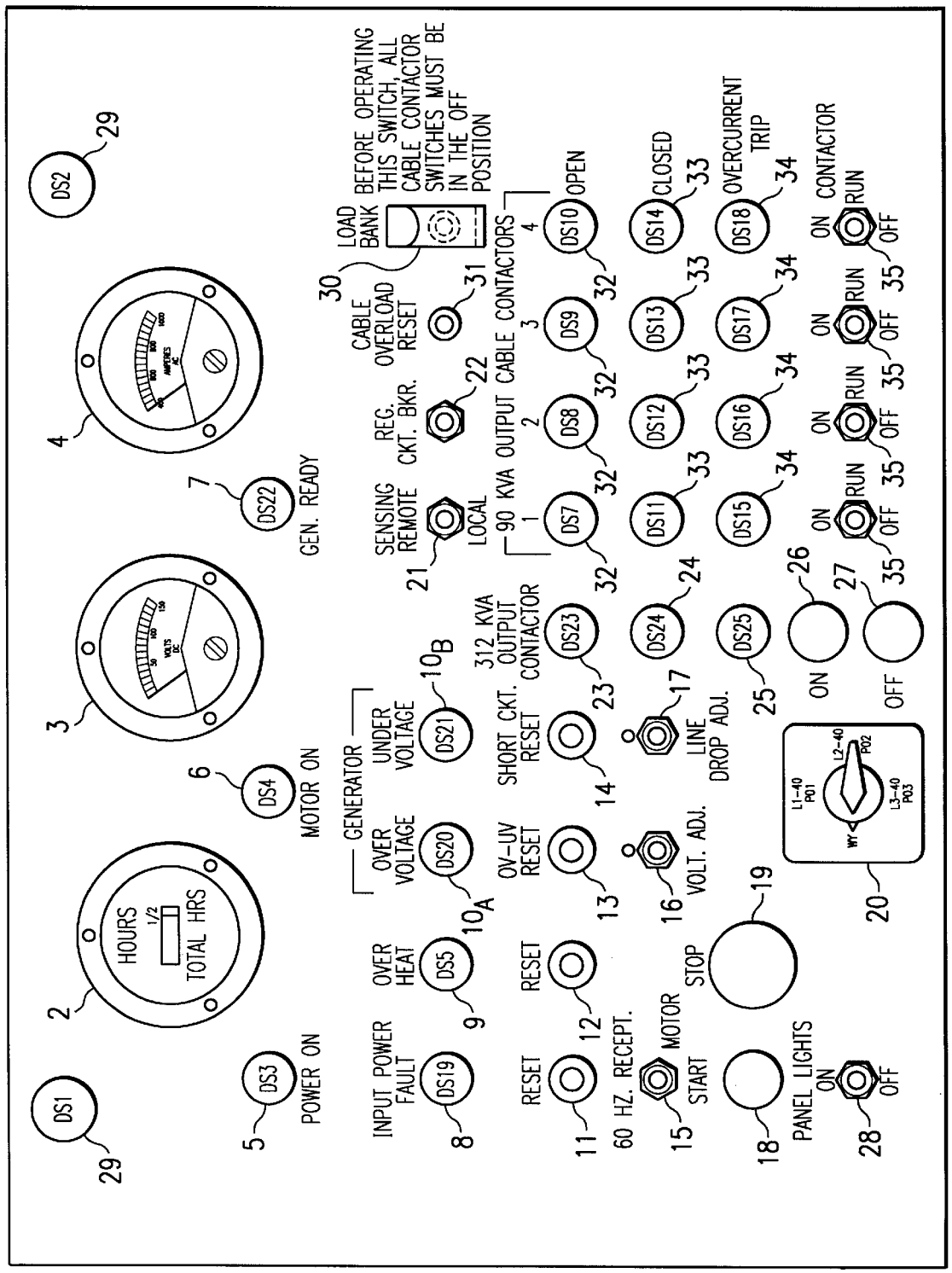
FIG. 1 shows a control panel for a prior art generator set.

Additionally, the DCS may provide measurement information simultaneously that prior art control/display systems do not display simultaneously. For example, prior art control/display systems typically provide an analog meter that displays the output voltage for a selected phase of a gen-set. A control switch is provided that allows an operator to select which phase of the gen-set to be displayed on the meter. As illustrated in FIG. 1, Output voltmeter 103 indicates the output voltage for the phase selected by Output Voltmeter/Ammeter Selector switch 120. With prior art systems only a single phase may be displayed for any measurement (e.g., voltage or current). Prior art systems have failed to display each measurement simultaneously. This is partially due to the added cost associated with the additional analog meters required to display each phase simultaneously. However, the DCS may graphically display measurements for each of the 3 phases simultaneously. As illustrated by FIG. 4, measurements for each of the 3 phases may be shown for the gen-set's output voltage, bus voltage, and the gen-set's output current.

Another exemplary feature that the DCS may offer that is not available with the prior art control/display devices is the ability of the DCS software to provide digital sensing for physical, mechanical control switches. That is, the software may monitor and sense mechanical devices, such as toggle switches that are provided in a gen-set and used for routine operational control of the gen-set. There may be several toggle switches on the face of a gen-set. Such mechanical switches may be used to perform various functions, such as starting the set. The switches may be wired to an A/D convertor and then read by the DCS software via the A/D converter interface. The switches may also be wired as digital inputs, preferably optically isolated, and read directly by digital inputs in the A/D converter or in the DCS itself.

The software may monitor such mechanical switches and adjust its control system and warnings according to the settings of such switches. For example, a gen-set may have an Engine Control switch 308 (as shown in FIG. 3) with 4 positions: (1) OFF, (2) PRIME & RUN AUX FUEL, (3) PRIME & RUN, and (4) START. The PRIME & RUN AUX FUEL position energizes the gen-set's run circuits with the auxiliary fuel pump operating. The PRIME & RUN position energizes the gen-set's run circuits with the auxiliary fuel pump de-energized. The DCS software may monitor this switch to determine whether it should energize the auxiliary fuel pump. The software may continually monitor such switches. For example, the software may poll or review the condition of the switches once every 200 milliseconds, which may allow for immediate, real-time response by the software to a change in a switch. Therefore, the DCS software is capable of monitoring mechanical switches in real-time and adjusting its performance according to the positions of such mechanical switches in real-time.

One important group of mechanical switches that the DCS may offer the ability to provide digital sensing for is the configuration or "set-up" mechanical switches. Such configuration switches may be used solely to identify the functional characteristics of a gen-set to the control system. That is, a unique set-up switch may be used to identify a gen-set's particular voltage output level, frequency rating or power output rating. For example, a gen-set may have a switch, such as switch 324 shown in FIG. 3, that allows an operator to identify the gen-set as either a 120/208 VAC or 240/416 VAC set. Other switches may also be provided to identify the output power or frequency ratings of a gen-set.

Alternative means of identifying functional characteristics may include mechanical switches that primarily serve to affect gen-set operation. These mechanical switches control gen-set behavior and also report switch position status to the DCS software program. For example, a gen-set may have a mechanical switch, such as switch 32 shown in FIG. 3, that allows the operator to configure the gen-set to be either a 60 Hz or a 50 Hz set. This action controls circuitry in the Engine Speed Governor module and causes gen-set output frequency to toggle between the two selectable frequencies. Additionally, this mechanical switch provides a sensing input to the DCS software program and therefore configures protective device Set Points contained within the software.

The configuration switches allow an operator to reconfigure a gen-set on the fly (i.e., in real-time) by simply changing the "personality" of the gen-set with the flip of a switch. Therefore, it becomes important that the DCS software be capable of sensing such configuration switches and adapting its performance according to a gen-set's configuration. For example, whether it is appropriate to have a protective action taken when a gen-set's output level is at 300 volts may depend on the gen-set's configuration.

The DCS's software may adapt to different gen-set configurations by sensing such mechanical set-up switches. For example, the software can adapt to a gen-set with 60 Hz operating speed based on switch 322 being set to 60 Hz. If switch 322 is positioned to the 50 Hz setting, the software may immediately adapt to the gen-set being configured as having a 50 Hz operating speed. The software may immediately recognize the gen-set as a 50 Hz set, and the software may modify or adapt all of the warning levels and Set Points to the new configuration of the gen-set. Thus, the gen-set configuration may be changed during run-time of the DCS software, and the software may adapt the operation and performance of the DCS to the new configuration settings. More specifically, the configuration switches, such as switch 322, may be coupled to analog or digital inputs on an A/D converter that connects to the DCS computer. The DCS software may monitor the switches and adapt its protective Set Points, meter scales, and the configuration sentence at the top of the screen accordingly.

Having the DCS software adaptable to different configuration settings may be desirable because it allows the DCS computer to be loaded with the DCS software and then operate perfectly for any of the gen-set configurations. Moreover, the DCS software may adapt to a change in a configuration setting without requiring a reboot of the DCS computer. Therefore, an operator may make changes to a gen-set "on the fly" or during run-time without rebooting the DCS computer, going through some lengthy menu for set-up, starting a new software program, or shutting down the gen-set. For example, an operator may borrow hardware from an idle gen-set which causes the operating gen-set to operate at 50 Hz rather than 60 Hz. The operator must only install the borrowed hardware and set the configuration switch 322 to 50 Hz. The DCS software will immediately adapt to the newly configured gen-set. Also, this feature allows the DCS to be implemented in many different types of gen-sets without requiring a lengthy set up and without requiring specialized software for each type of gen-set. Therefore, the DCS may be installed with software that is readily adaptable to many types of gen-set configurations.

Another exemplary feature that the DCS may offer that is not available with the prior art control/display devices is the ability of the DCS to automatically initiate protective actions. That is, the DCS may perform protective actions through software that were previously performed by dedicated circuits (i.e., hardware) in prior art gen-sets. The DCS may monitor the measurement levels for certain analog characteristics associated with a gen-set, and the DCS may cause protective actions to be performed if a particular measurement level is detected (e.g., if a Set Point is achieved). Examples of analog characteristics that the DCS may monitor to determine whether a protective action is required include, but are not limited to: fuel level, coolant temperature, oil pressure, output voltage, output current, and output power. Signals for such characteristics are input to the DCS computer, where the DCS software evaluates the measurement of such characteristics and determines whether some type of protective action is required to be taken. More specifically, the software may compare the measurement of the received signals to a Set Point (i.e., a preset level) for such signal, and then determine that a particular type of protective action is required if the Set Point level is achieved.

For example, if the software determines that the voltage level is too high (e.g., has achieved a Set Point), the software may cause the output breaker to be opened as a protective measure. The software may trigger an external relay circuit upon determining that a Set Point has been achieved for a particular input signal. Therefore, when certain fault events are detected not only may a Fault Summary area 420 indicator be displayed to an operator along with a message in Detailed Message area 406, but the software may also generate certain protective actions on its own without requiring interaction by an operator.

The software may provide multiple levels of fault warnings indicating differing levels of severity. For example, the software may provide a "high out of range warning," a "high warning," a "low warning," and a "low out of range warning." The high out of range warning may indicate that the sensed signal has reached a level that it was not ever expected to reach. Suppose that the software determines based on the received fuel level signal that the fuel level is at 200%. Obviously, the fuel level is not expected to ever exceed 100% (i.e., the top end mechanical limit of the fuel level sensor). Therefore, the software can alert the operator that a problem may exist with the sensor for the fuel level or due to some other component of the gen-set. The software may be intelligent enough to realize that a high out of range signal is a false signal and not initiate a corrective action (other than alerting the operator as to the out of range signal being detected). Similarly, the software may be intelligent enough to determine that a low out of range signal has been detected. Suppose that the software determines based on the received fuel level signal that the fuel level is at −100%. Obviously, the fuel level is not expected to ever be below 0% (i.e., the lowest possible mechanical limit of the sensor). Therefore, the software can alert the operator that a problem may exist causing a false, out of range signal. The software may be intelligent enough to realize that the low out of range signal is a false signal and not initiate a corrective action, such as shutting down the gen-set due to low out of range fuel level.

Some monitored measurements may not have a high out of range Set Point or a low out of range Set Point. For example, the output voltage level may not have an out of range Set Point. The software may also measure the time that it takes for a particular measurement to reach a given level. For example, suppose that a high level shutdown for output voltage is set at 300 VAC, such that the software will shutdown the gen-set if the output voltage reaches 300 VAC. Thus, it should be impossible for the output voltage to reach 500 VAC slowly because the software would detect such an increase and shutdown the gen-set at 300 VAC. Thus, if the software determines that the output voltage has jumped to 500 VAC very quickly, the software may determine that such a measurement is incorrect and notify the operator to check the output voltage sensors and circuitry. Therefore, the software may also monitor the speed with which certain levels are achieved by the monitored measurements to determine whether they are "true" measurements.

The software may provide a Set Point to detect a high warning fault condition and a low warning fault condition. If such Set Points are achieved, the software may warn the operator of a fault condition and/or initiate a corrective action. Within each high warning fault condition and each low warning fault condition, there may be multiple levels of fault warnings provided indicating differing levels of severity for each warning. For example, a "high warning" fault condition may be provided and a "high shutdown" fault condition may also be provided. A Set Point level may be set for a particular characteristic of the gen-set, such as output voltage, which if achieved will indicate a high warning fault condition. A high warning fault condition may cause a warning to be presented to an operator and/or less crucial corrective action to be initiated by the software. Another Set Point level may be set for a particular characteristic of the gen-set, which if achieved will indicate a "high shutdown" fault condition. When a Set Point is achieved for a "high shutdown" fault condition, the software may initiate more crucial corrective action to be taken, such as shutting down the gen-set.

Similar Set Points may be provided for low warning fault condition and low shutdown fault condition. For example, a low warning fault condition Set Point may be provided at 20% for the fuel level. Thus, if the fuel level falls to 20%, a warning will be presented to the operator. A low shutdown fault condition Set Point may be provided at 10% for the fuel level. Thus, if the fuel level continues to fall to the point of 10%, the software may initiate a shutdown of the gen-set.

Not only may multiple levels of fault conditions (e.g., high out of range, high shutdown, high warning, low warning, low shutdown, and low out of range) be provided by the software, but fault conditions may also be based upon multiple discrete parameter inputs. For example, a warning for low oil pressure may be issued only if the oil pressure is below a particular Set Point (e.g., less than 20 pounds of pressure), and the gen-set is not in Battleshort mode, and the start switch has been in the run position for at least 20 seconds. By monitoring multiple discrete parameter inputs and basing its actions on multiple discrete parameter inputs, the DCS is capable of monitoring and controlling the operation of the gen-set more intelligently than prior art control systems.

Another exemplary feature that the DCS may offer that is not available with the prior art control/display devices is the ability of the DCS to monitor both sides of the output breaker and display the voltage difference across the breaker. This is particularly important for parallel operation of gen-sets. On one side of the output breaker is the output voltage from the gen-set, and on the other side of the breaker is the distribution system to which the gen-set is connected. The gen-set may be connected in parallel with another utility such that the utility provides power until it fails, and then the gen-set provides power. The DCS may be capable of monitoring not only the gen-set output side of the breaker, but the DCS may also be capable of monitoring the other side of the breaker and displaying any difference in voltage across the breaker. An example of this is illustrated in FIG. 4 as the "delta VAC" meter 405.

As shown, delta VAC meter 405 may provide a bar graph and a numeric display that shows an operator at a glance whether there is a voltage difference across the output breaker. Displaying the voltage difference across the output breaker provides an operator aid in paralleling gen-sets. If, for example, an operator notices that there is a 10 volt difference across the output breaker, the operator may adjust the gen-set to match what is on the other side of the breaker before closing the breaker. Failure to adjust the gen-set in this way may result in a much shorter life for the output breaker or damage the gen-set. Therefore, monitoring both sides of the output breaker may work to increase the operator's ability to operate a gen-set safely and extend the life of the hardware.

Another exemplary feature that the DCS may offer that is not available with the prior art control/display devices is the ability of the DCS to provide remote operation graphically.

That is, the DCS may allow for the gen-set's measurements to be monitored and controlled by a computer at a location remote from the gen-set via a computer network. Such a computer network may be provided in a variety of ways well-known within the computer networking arts. An example of one way to network a gen-set with a remote computer is via Ethernet. An example of another way to network a gen-set with a remote computer utilizes the AID device as a network hub.

An operator at a remote site may be provided a graphical user-interface similar to those shown in FIGS. 4 and 5. Furthermore, an operator at a remote site may be given additional features or options to better allow a remote operator to control the gen-set. For example, the remote operator may be provided with a software switch to clear the Detailed Message area 406. Such a switch may be desirable for a remote operator because otherwise a remote operator may have no means of clearing the fault messages (e.g., the operator does not have access to a mechanical FAULT RESET switch on the control panel of the gen-set because the operator is at a remote location). Also, a remote operator may be provided with a Battleshort control software switch that allows the remote operator to place the gen-set in Battleshort mode through the software. The remote operator may also be provided with a Shutdown Gen-Set software switch that allows the operator to shutdown the gen-set from a remote location. Other options may be provided as well to remote operators to allow for increased control of a gen-set remotely.

Another exemplary feature that the DCS may offer that is not available with the prior art control/display devices is the ability of the DCS software to control external circuits under operator command, or on its own based upon programming (e.g., established Set Points within the software) and/or on the state of input sensors. The software may generate a digital string of information that is transmitted from the DCS computer, such as CIM 108 or PCs 110 shown in FIG. 1, to an AID device, such as A/D device 104 shown in FIG. 1. The AID device may then interpret that information and toggle relays based on commands initiated from the DCS software. Thus, the software may initiate commands to trigger external relay circuits.

There are many different types of external circuits that may be controlled by the software, and three examples of such external circuits related to a gen-set are discussed hereafter. A first example of an external circuit that the software may control is the fuel pump on a gen-set. The software commands may cause the fuel pump to turn on when the fuel level is low and turn off when the fuel level is high.

A second example of an external circuit that the software may control is the engine for a gen-set. The software commands may cause the engine to be enabled (i.e., capable of running), and if there is a fault in the gen-set detected by the control system the software may cause the engine to be disabled (i.e., turn off the engine). Such a fault that may be detected by the control system and cause the engine to be disabled may be a low fuel fault. More specifically, the DCS software may determine that a shutdown Set Point for low fuel level has been achieved. Accordingly, the software may be capable of securing the engine on a gen-set.

A third example of an external circuit that the software may control is an output breaker. The software may decide whether to allow a circuit breaker to be opened or closed. That is, a user may request that a circuit breaker be opened or closed using a switch, and thereafter, the software will decide whether the conditions are appropriate prior to allowing such a request. In a gen-set the output breaker is what "links" the set to the outside world. Suppose a gen-set is being used to provide power to a military village. If the output breaker is closed then the city is supplied power by the gen-set. However, if conditions are faulty inside of the gen-set, such as the gen-set has "over voltage," the software may sense the over voltage and initiate a protective action to open the output breaker in order to protect the gen-set or the load.

Turning to FIGS. 6A through 6D, an exemplary flow diagram for the DCS software is shown. The exemplary flow diagram starts at Point A 602. The software may read the various variables for graphical display positioning at step 604. That is, the software may read the variables that determine how the screen looks (e.g., where various things are located on the screen). These variables may contain information relating to where items are positioned on the screen depending on the display mode. That is, the variables may contain information as to which items are displayed for FULL and MAIN display modes, as well as where to position each item for each display mode. The software may then read the data string information received from the various mechanical switches and other analog sensors at step 606. That is, the software reads the various input signals that are received by the CIM 108 (or PCs 110) from the signal conditioning module 104. The software interprets the received signals as measurements of the analog characteristics and status of the mechanical components of the gen-set, and then the software draws or updates the display screen at step 608, displaying the status or measurement of one or more of the received signals in real-time.

At step 610 the software compares the various analog measurement conditions with preset Set Points, and determines whether a Set Point is exceeded for any monitored characteristic of the gen-set at step 612. If a Set Point is exceeded then the software branches to Point B at step 614. If a Step Point is not exceeded, the software compares the sensed conditions (from the external devices) with preset software Set Points at step 616, and the software determines whether, based on the comparison of step 616, a fault event is reported within a particular module at step 618. If a fault event is not reported, the software branches to Point C at step 620, and if a fault event is reported, the software branches to Point D at step 622. Thereafter, the software loops back to starting Point A 602, and repeats the process. The software may complete the loop shown in FIG. 6A from starting Point A 602 through the various steps of the program including branches Point B, Point C, and Point D, fast enough to allow the DCS to monitor and control the gen-set in real-time. For example, the software may perform the loop 5 or more times per second (i.e., the software may loop once every 200 milliseconds or faster).

Figure 6B:
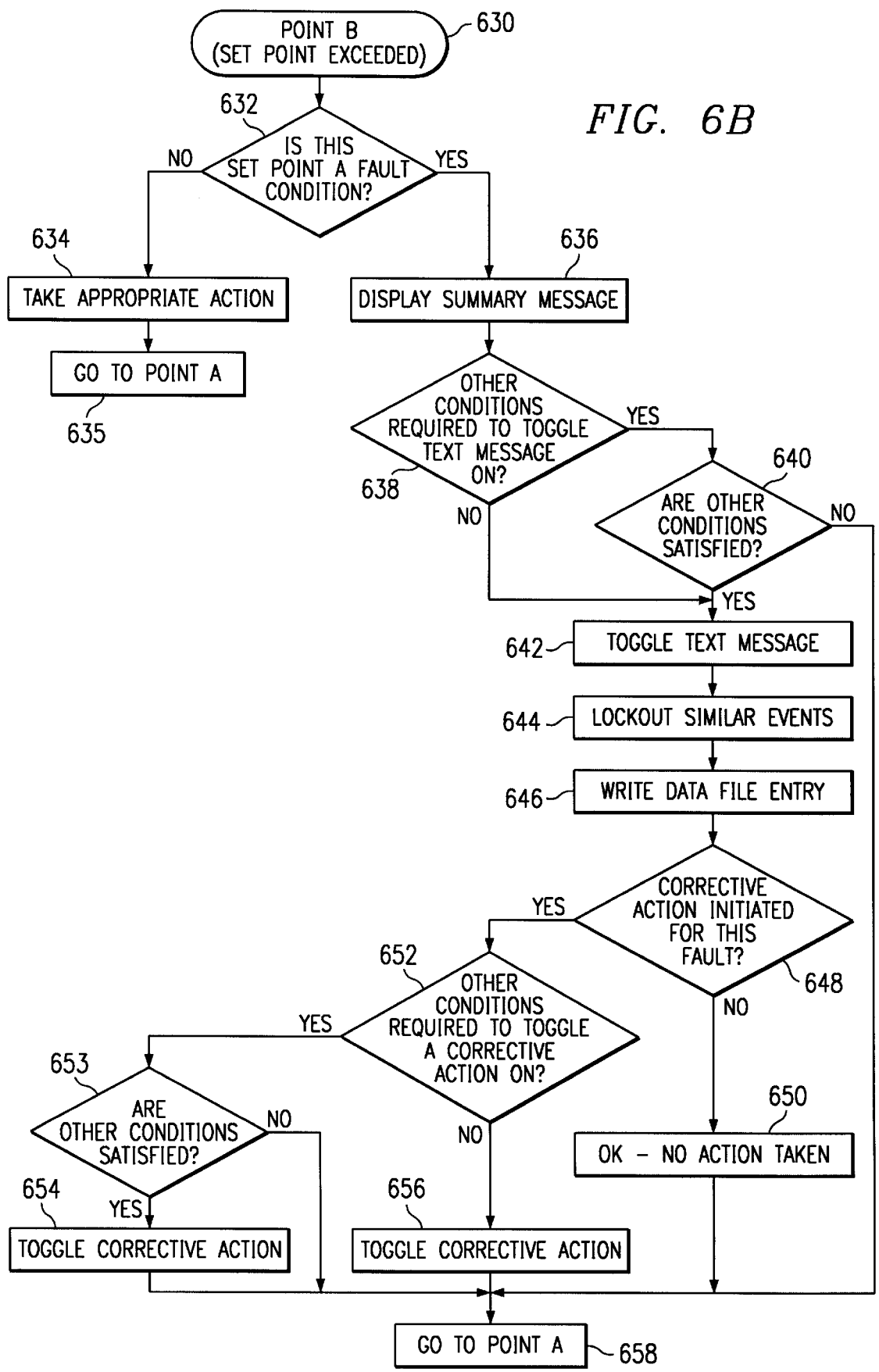

Turning to FIG. 6B, an exemplary flow chart following Point B is shown. The software branches to Point B 630 if it is determined that a Set Point has been exceeded. At step 632, the software determines whether the Set Point that has been exceeded indicates a fault condition. If it does not indicate a fault condition, the software takes whatever action is appropriate at step 634. For example, a Set Point may be preset for the fuel level signal at 30% to initiate the fuel transfer pump. Thereafter, if the fuel level signal falls to the 30% Set Point, the software may toggle the fuel transfer pump ON. Such a Set Point does not indicate a fault, but does initiate an action (i.e., toggling the fuel transfer pump ON). After initiating the appropriate action, the software returns to the starting Point A at step 635.

If the software determines at step 632 that a fault condition has been detected, the software displays a summary message at step 636. The software then determines whether other conditions are required to toggle the text message ON at step 638. If it is determined that no other conditions are required, the software toggles the text message ON at step 642. If it is determined at step 638 that other conditions are required to toggle the text message ON, the software determines whether the required conditions are satisfied at step 640. Other conditions may be required to display a text message. For example, in order to display a text message warning for low oil pressure, the software may require that the oil pressure be below 20 pounds of pressure (i.e., below the 20 pound Set Point), the gen-set not be in Battleshort mode, and the start switch have been in the run position for at least 20 seconds. Therefore, multiple conditions may be required to be satisfied to display a text warning message or take other action by the software. If the required conditions are not satisfied, the software loops back to starting Point A at step 658. If at step 640 it is determined that the required conditions are satisfied, the software toggles the text message ON at step 642.

After the software has toggled the text message at step 642, it will advance to step 644 where the software will lockout similar events. That is, the software will lockout any fault circuit that causes the identical result (e.g., any fault circuit that causes the same text message). At step 646, the software writes a data entry to a file recording the state of the gen-set at the time of the detection of the fault condition. In this manner, the software writes a data entry upon detecting a fault condition.

At step 648, the software determines whether it requires a corrective action to be initiated for the detected fault (e.g., opening the output breaker due to an over voltage situation). If no corrective action is required, then the software takes no further action, illustrated by step 650, and it advances to starting Point A at step 658. However, if a corrective action is required, the software determines whether other conditions are also required to toggle a corrective action ON at step 652. If it is determined at step 652 that no other conditions are required to toggle a corrective action ON, the software will toggle the corrective action ON at step 656. Thereafter, the software will return to starting Point A at step 658. If, on the other hand, it is determined at step 652 that other conditions are required, the software determines whether the required conditions are satisfied at step 653. If the required conditions are not satisfied, the software returns to starting Point A at step 658. If the required conditions are satisfied, the software toggles the appropriate corrective action ON at step 654 and returns to starting Point A at step 658. Thus, regardless of the determinations made at steps 640, 648, 652 and 653, the software will advance to step 658.

Figure 6C:
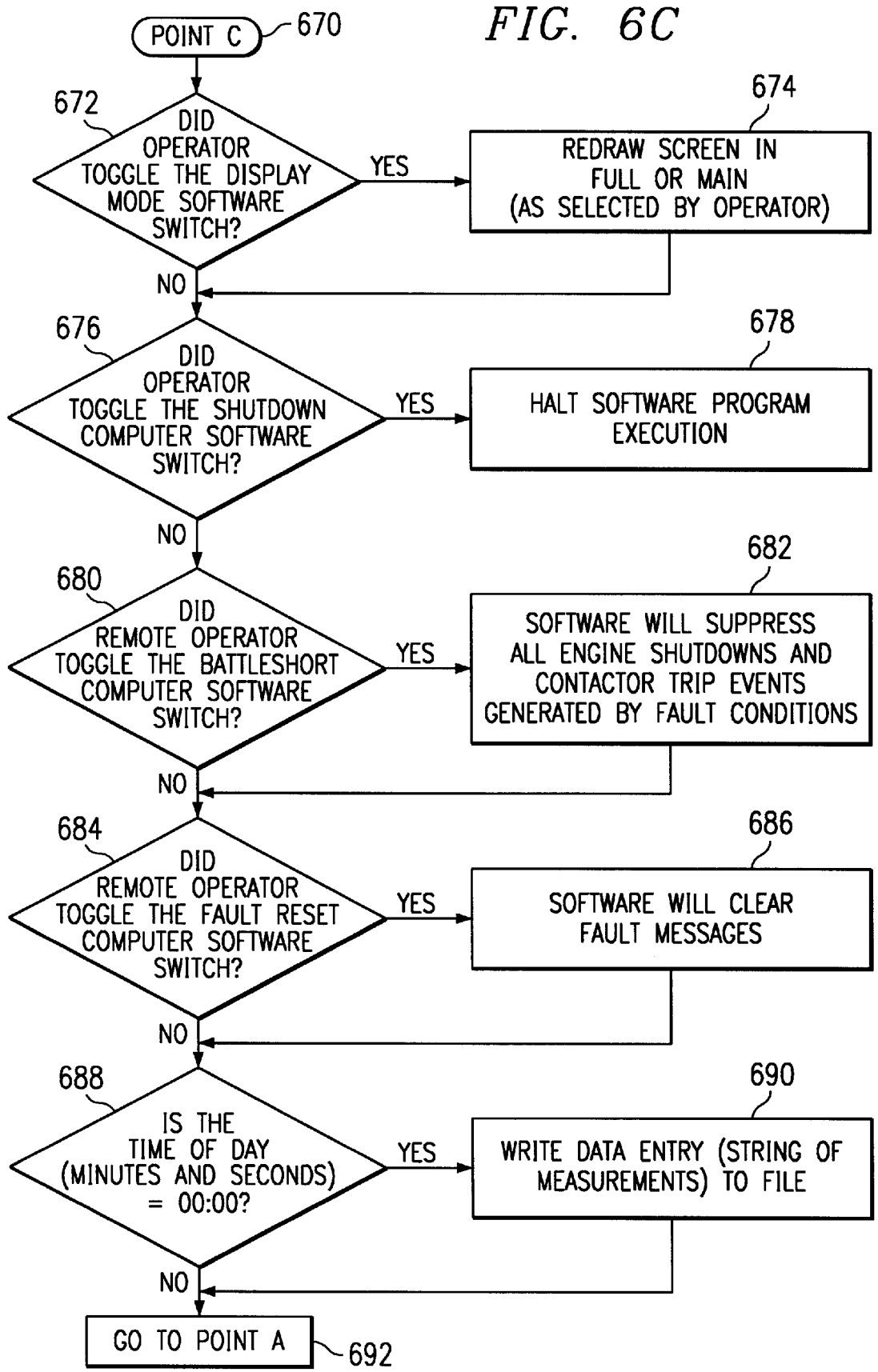

Turning to FIG. 6C, an exemplary flow chart following Point C 670 is shown. At step 672, the software determines whether an operator toggled the DISPLAY MODE software switch (shown in FIGS. 4 and 5 as DISPLAY MODE switch 410). If it is determined that an operator did toggle the DISPLAY MODE software switch, the software redraws/updates the screen to show the mode requested by the operator at step 674. That is, the software displays either FULL MODE or MAIN MODE, whichever was requested by the operator. At step 676, the software determines whether an operator toggled the SHUTDOWN computer software switch. If so, the software halts program execution at step 678. Most preferably, this process will automatically be sensed by an external circuit, and will cause the gen-set's engine to shutdown.

At step 680, the software determines whether a remote operator toggled the BATTLESHORT computer software switch. If so, the software will suppress all engine shutdowns and contactor trip events generated by fault conditions at step 682. At step 684, the software determines whether a remote operator toggled the FAULT RESET computer software switch. If so, the software will clear the fault messages at step 686. At step 688, the software determines if the top of an hour is reached (i.e., minutes and seconds are 00:00). If so, the software writes one data entry to a file containing a string of measurements at step 690. Thereafter, the software program returns to starting Point A at step 692.

Turning to FIG. 6D, an exemplary flow chart following Point D 700 is shown. At step 702, the software displays a summary message. At step 704, the software toggles the text message. At step 706, the software lockouts similar events. That is, the software will lockout any fault circuit that causes the identical result (e.g., any fault circuit that causes the same text message). At step 708, the software writes a data file entry recording the state of the gen-set at the time that the fault event was detected. The software then returns to starting Point A at step 710.

The Digital Control System has been described herein in conjunction with a gen-set. Generally, a gen-set is a self-contained unit, in contrast to electric utility generators, which are typically permanently installed in a power plant and controlled from a separate control room. The Digital Control System may be used with a stationary gen-set or a mobile gen-set, and both are within the scope of the present invention. "Mobile" as used herein means that the gen-set may be designed to be transportable to an operating site. For example, a mobile gen-set may have wheels or it may be transported by a forklift or other transporting device. Some mobile gen-set's may be transported while they are operating, and other gen-set's are transported while not in use. Even though a mobile gen-set may be tied down, connected to fixed lines, connected to fuel lines, and connected to fixed equipment when operating, such a gen-set is still considered "mobile."

Although the present invention and its advantages have been described in detail, it should be understood that various changes, substitutions and alterations can be made herein without departing from the spirit and scope of the invention as defined by the appended claims.

What is claimed is:

1. A digital control system for a electric generator set, said digital control system comprising:

a computer for receiving multiple discrete parameter inputs, wherein said multiple discrete parameter inputs include at least one first signal representing the value of an analog characteristic associated with the generator set;

a display for displaying measurements of said analog characteristics associated with the generator set;

a software program running on said computer to interpret the received at least one first signal as measurements of analog characteristics associated with the generator set, to monitor said measurements, and to graphically display at least one of said measurements, wherein said software program is capable of adapting its execution to different generator set configurations in real-time.

2. The digital control system of claim 1, further comprising:

wherein said multiple discrete parameter inputs further include at least one second signal representing the status of a digital characteristic associated with the generator set; and said software program running on said computer to interpret the received at least one second signal as status of digital characteristics associated with the generator set.

3. The digital control system of claim 1, further comprising:

an input device for allowing an operator to interact with said computer.

4. The digital control system of claim 2, further comprising:

said digital characteristic associated with the generator set includes mechanical switches on the generator, whereby said computer running said software program may determine the position of said mechanical switches.

5. The digital control system of claim 1, further comprising:

said software program containing at least one Set Point for at least one of said measurements, wherein said at least one Set Point indicates a reference level for said at least one of said measurements; and said software program capable of determining that a fault condition exists when one or more of said measurements achieves a Set Point associated with said one or more of said measurements.

6. The digital control system of claim 5, further comprising:

said software program containing multiple Set Points for at least one of said measurements; and said software program providing multiple fault levels differing in severity for said at least one of said measurements.

7. The digital control system of claim 5, further comprising:

said software program capable of monitoring said multiple discrete parameter inputs; and said software program capable of determining that a fault condition exists based upon at least two of said multiple discrete parameter inputs.

8. The digital control system of claim 5, further comprising:

said software program capable of displaying a textual message when said software program determines that a fault condition exists, wherein said textual message includes text suggesting an action to take in response to the detected fault condition.

9. The digital control system of claim 8, wherein said textual message further includes at least one statement selected from the group consisting of:

a description of the detected fault condition, and a reference to a source of information about the detected fault condition.

10. The digital control system of claim 1, further comprising:

a data file, wherein said software program is capable of writing an entry to said data file, said entry containing information regarding the generator set's characteristics.

11. The digital control system of claim 10, wherein said entry contains at least one data element selected from the group consisting of:

date of entry being written to said data file, time of entry being written to said data file, amount of time that the generator set has been energized, measurement of a characteristic of said generator set, and special comments about the operation of said generator set.

12. The digital control system of claim 10, further comprising:

said software program writing said entry to a data file periodically.

13. The digital control system of claim 10, further comprising:

said software program writing said entry to a data file upon occurrence of a fault condition.

14. The digital control system of claim 1, further comprising:

said software program capable of monitoring configuration switches on the generator set and adapting said software program's operation according to the generator set's configuration in real-time, wherein adapting said software program's operation includes adapting Set Points contained within the software program for determining whether a fault condition exists to the generator set's configuration.

15. The digital control system of claim 1, further comprising:

said software program providing at least one configurable graphical display.

16. The digital control system of claim 15, wherein a first graphical display includes displaying only measurements received by said computer that are critical for normal operation of the generator set.

17. The digital control system of claim 15, wherein a second graphical display includes displaying all measurements of the generator set received by said computer.

18. The digital control system of claim 17, wherein said displaying all measurements includes displaying voltage for all 3 phases of a generator set simultaneously.

19. The digital control system of claim 1, further comprising:

said software program capable of determining the difference in the output voltage of a generator set and the voltage existing on the bus, which represents the difference in voltage across the output breaker of the generator set; and said software program capable of displaying the difference in voltage across the output breaker of the generator set.

20. The digital control system of claim 19, further comprising:

said software program capable of monitoring the difference in voltage across the output breaker of the generator set; and said software program capable of allowing the contactor of a generator set to close only if said difference in voltage across the output breaker is below a preset level.

21. The digital control system of claim 1, wherein said computer, said display and said software program are operating at a site remote to the generator set.

22. A method of monitoring and controlling a generator set, said method comprising:

receiving multiple discrete parameter inputs, wherein said multiple discrete parameter inputs include at least one first signal representing the value of an analog characteristic associated with the generator set;

interpreting the received at least one first signal as measurements of analog characteristics associated with the generator set; and graphically displaying as a configurable graphical display at least one of said measurements of analog characteristics associated with the generator set.

23. The method of claim 22, further comprising:

wherein said multiple discrete parameter inputs further include at least one second signal representing the status of a digital characteristic associated with the generator set; and interpreting the received at least one second signal as status of digital characteristics associated with the generator set.

24. The method of claim 22, further comprising:

monitoring said multiple discrete parameter inputs; and determining whether a fault condition exists.

25. The method of claim 24, wherein said step of monitoring includes:

setting at least one Set Point for one or more of the received at least one first signal, wherein said Set Point indicates a reference level for said one or more of the received at least one first signal; and comparing said one or more of the received at least one first signal with said at least one Set Point to determine whether said one or more of the received at least one first signal has achieved said at least one Set Point.

26. The method of claim 25, wherein said step of determining includes determining that a fault condition exists when said one or more of the received at least one first signal achieves said at least one Set Point.

27. The method of claim 26, further comprising:

setting at least two Set Points for one or more of the received at least one first signal, wherein a first Set Point indicates a fault level having a first severity and a second Set Point indicates a fault level having a second severity;

determining that a fault condition having a first severity exists when said one or more of the received at least one first signal achieves said first Set Point; and determining that a fault condition having a second severity exists when said one or more of the received at least one first signal achieves said second Set Point.

28. The method of claim 24, wherein said step of determining includes determining whether a fault condition exists based upon at least two of said multiple discrete parameter inputs.

29. The method of claim 24, further comprising:

displaying a textual message if it is determined that a fault condition exists, wherein said textual message includes text suggesting an action to take in response to the determined fault condition.

30. The method of claim 29, wherein said textual message further includes at least one statement selected from the group consisting of:

a description of the detected fault condition, and a reference to a source of information about the detected fault condition.

31. The method of claim 22, further comprising:

writing an entry to a data file, said entry containing information regarding the generator set's characteristics.

32. The method of claim 31, wherein said entry contains at least one data element selected from the group consisting of:

date of said entry being written to said data file, time of said entry being written to said data file, amount of time that the generator set has been energized, measurement of a characteristic of said generator set, and special comments about the operation of said generator set.

33. The method of claim 31, further comprising:

writing said entry to a data file periodically.

34. The method of claim 31, further comprising:

writing said entry to a data file upon occurrence of a fault condition.

35. The method of claim 22, further comprising:

adapting said method of monitoring and controlling a generator set to different generator set con-figurations in real-time, wherein said step of adapting includes adjusting Set Points indicating a reference level for at least one of said measurements, said Set Points aid in determining whether a fault condition exists.

36. The method of claim 35, wherein said step of adapting includes:

monitoring configuration switches on the generator set; and adjusting said Set Points in accordance with the generator set's configuration switches.

37. The method of claim 22, wherein said configurable graphical display is a user-configurable graphical display in which a user can select at least one of multiple display configurations for displaying said at least one of said measurements.

38. The method of claim 37, wherein a first selectable graphical display includes only measurements critical for normal operation of the generator set.

39. The method of claim 37, wherein a second selectable graphical display includes all of said received measurements of the generator set.

40. The method of claim 39, wherein said displaying all of said received measurements includes displaying voltage for all 3 phases of the generator set simultaneously.

41. The method of claim 22, further comprising:

computing the difference in the output voltage of the generator set and the voltage existing on the bus, said difference represents the difference in voltage across the output breaker of the generator set; and displaying said difference in voltage across the output breaker of the generator set.

42. The method of claim 41, further comprising:

monitoring said difference in voltage across the output breaker of the generator set; and allowing a generator set's contactor to close only if said difference in voltage across the output breaker is below a preset level.

43. The method of claim 22, wherein said computer, said steps of receiving multiple discrete parameter inputs, interpreting the received first signals, and graphically displaying are performed at a site remote to the generator set.

44. The method of claim 22, wherein said software program configures said configurable graphical display in which said software program selects at least one of multiple display configurations for displaying said at least one of said measurements.

45. The method of claim 44, wherein said software program selects said at least one of multiple display configurations based at least in part on said monitored measurements.

46. A generator set comprising:

a digital control system;

said digital control system includes a computer for receiving multiple discrete parameter inputs, wherein said multiple discrete parameter inputs includes at least one first signal representing the value of an analog characteristic associated with the generator set;

said digital control system further includes a display for displaying measurements of said analog characteristics associated with the generator set;

said digital control system further includes a software program running on said computer to interpret the received at least one first signal as measurements of analog characteristics associated with the generator set, to monitor said measurements, and graphically display at least one of said measurements; and said software program includes code for displaying a textual message when said software program determines that a fault condition exists, wherein said textual message includes text suggesting an action to take in response to the detected fault condition.

47. The generator set of claim 46, further comprising:

wherein said multiple discrete parameter inputs includes at least one second signal representing the status of a digital characteristic associated with the generator set; and said software program running on said computer to interpret the received at least one second signal as status of digital characteristics associated with the generator set.

48. The generator set of claim 46, further comprising:

said digital control system further includes an input device for allowing an operator to interact with said computer.

49. The generator set of claim 46, further comprising:

said software program containing at least one Set Point for at least one of said measurements, wherein said at least one Set Point indicates a reference level for said at least one of said measurements; and said software program capable of determining that a fault condition exists when one or more of said measurements achieves a Set Point associated with said one or more of said measurements.

50. The generator set of claim 49, further comprising:

said software program containing multiple Set Points for at least one of said measurements; and said software program providing multiple fault levels differing in severity for said at least one of said measurements.

51. The generator set of claim 49, further comprising:

said software program including code for monitoring said multiple discrete parameter inputs; and said software program including code for determining that a fault condition exists based upon at least two of said multiple discrete parameter inputs.

52. The generator set of claim 46 wherein said textual message further includes at least one statement selected from the group consisting of:

a description of the detected fault condition, and a reference to a source of information about the detected fault condition.

53. The generator set of claim 46, further comprising:

a data file, wherein said software program includes code for writing an entry to said data file, said entry containing information regarding the generator set's characteristics.

54. The generator set of claim 53, wherein said entry contains at least one data element selected from the group consisting of:

date of entry being written to said data file, time of entry being written to said data file, amount of time that the generator set has been energized, measurement of a characteristic of said generator set, and special comments about the operation of said generator set.

55. The generator set of claim 53, further comprising:

said software program writing said entry to a data file periodically.

56. The generator set of claim 53, further comprising:

said software program writing said entry to a data file upon occurrence of a fault condition.

57. A digital control system for a electric generator set, said digital control system comprising:

a computer for receiving multiple discrete parameter inputs, wherein said multiple discrete parameter inputs include at least one first signal representing the value of an analog characteristic associated with the generator set;

a display for displaying measurements of said analog characteristics associated with the generator set;

a software program running on said computer to interpret the received at least one first signal as measurements of analog characteristics associated with the generator set, to monitor said measurements, and to graphically display, as a configurable graphical display, at least one of said measurements.

58. The digital control system of claim 57 wherein said configurable graphical display is a user-configurable graphical display in which a user can select at least one of multiple display configurations for displaying said at least one of said measurements.

59. The digital control system of claim 58 wherein a first selectable graphical display includes only measurements critical for normal operation of the generator set.

60. The digital control system of claim 58 wherein a second selectable graphical display includes all of said received measurements of the generator set.

61. The digital control system of claim 60 wherein said displaying all of said received measurements includes displaying voltage for all 3 phases of the generator set simultaneously.

62. The digital control system of claim 57 wherein said software program configures said configurable graphical display in which said software program selects at least one of multiple display configurations for displaying said at least one of said measurements.

63. The digital control system of claim 62 wherein said software program selects said at least one of multiple display configurations based at least in part on said measurements.

64. The digital control system of claim 57, further comprising:

said software program containing at least one Set Point for at least one of said measurements, wherein said at least one Set Point indicates a reference level for said at least one of said measurements; and said software program capable of determining that a fault condition exists when one or more of said measurements achieves a Set Point associated with said one or more of said measurements.

65. The digital control system of claim 64, further comprising:

said software program containing multiple Set Points for at least one of said measurements; and said software program providing multiple fault levels differing in severity for said at least one of said measurements.

66. The digital control system of claim 64, further comprising:

said software program capable of monitoring said multiple discrete parameter inputs; and said software program capable of determining that a fault condition exists based upon at least two of said multiple discrete parameter inputs.

67. The digital control system of claim 64, further comprising:
said software program capable of displaying a textual message when said software program determines that a fault condition exists, wherein said textual message includes text suggesting an action to take in response to the detected fault condition.

68. The digital control system of claim 67, wherein said textual message further includes at least one statement selected from the group consisting of:
a description of the detected fault condition, and a reference to a source of information about the detected fault condition.

69. The digital control system of claim 57, further comprising:
a data file, wherein said software program is capable of writing an entry to said data file, said entry containing information regarding the generator set's characteristics.

70. The digital control system of claim 69 wherein said entry contains at least one data element selected from the group consisting of:
date of entry being written to said data file, time of entry being written to said data file, amount of time that the generator set has been energized, measurement of a characteristic of said generator set, and special comments about the operation of said generator set.

71. The digital control system of claim 57, further comprising:
said software program capable of monitoring configuration switches on the generator set and adapting said software program's operation according to the generator set's configuration in real-time, wherein adapting said software program's operation includes adapting Set Points contained within the software program for determining whether a fault condition exists to the generator set's configuration.

72. A method of monitoring and controlling a generator set, said method comprising:
receiving into a digital control system multiple discrete parameter inputs, wherein said multiple discrete parameter inputs include at least one first signal representing the value of an analog characteristic associated with the generator set;
said digital control system interpreting the received at least one first signal as measurements of analog characteristics associated with the generator set;
said digital control system graphically displaying at least one of said measurements of analog characteristics associated with the generator set; and
said digital control system determining whether a fault condition exists based at least in part on whether one or more of said measurements achieves a determined reference level for said one or more of said measurements; and
said digital control system adapting in real-time to a change in the generator set's configuration, wherein said adapting allows said digital control system to correctly perform said determining whether a fault condition exists given said change in the generator set's configuration.

73. The method of claim 72 wherein said multiple discrete parameter inputs further include at least one second signal representing the status of a digital characteristic associated with the generator set.

74. The method of claim 72 further comprising: said digital control system interpreting the received at least one second signal as status of digital characteristics associated with the generator set.

75. The method of claim 74 wherein said digital characteristic associated with the generator set includes one or more mechanical switches.

76. The method of claim 75 wherein said digital control system interprets the received at least one second signal as the position of said one or more mechanical switches.

77. The method of claim 72 wherein said determining whether a fault condition exists further comprises:
said digital control system determining whether one or more of said measurements achieves a determined reference level associated with said one or more of said measurements, wherein said digital control system determines that a fault condition exists when one or more of said measurements achieves said determined reference level.

78. The method of claim 77 wherein said determining whether a fault condition exists further comprises:
said digital control system determining whether one of multiple fault levels differing in severity exist for said at least one of said measurements.

79. The method of claim 77 wherein said determining whether a fault condition exists further comprises:
said digital control system monitoring said multiple discrete parameter inputs; and
said digital control system determining whether a fault condition exists based upon at least two of said multiple discrete parameter inputs.

80. The method of claim 72, further comprising:
said digital control system displaying a textual message when said digital control system determines that a fault condition exists, wherein said textual message includes text suggesting an action to take in response to the detected fault condition.

81. The method of claim 80 wherein said textual message further includes at least one statement selected from the group consisting of:
a description of the detected fault condition, and a reference to a source of information about the detected fault condition.

82. The method of claim 72, further comprising:
said digital control system writing an entry to a data file, said entry containing information regarding the generator set's characteristics.

83. The method of claim 82, wherein said entry contains at least one data element selected from the group consisting of:
date of entry being written to said data file, time of entry being written to said data file, amount of time that the generator set has been energized, measurement of a characteristic of said generator set, and special comments about the operation of said generator set.

84. The method of claim 82 wherein said digital control system writes said entry to a data file upon determining the existence of a fault condition.

85. The method of claim 72 wherein said digital control system adapting in real-time to a change in the generator set's configuration further comprises:
said digital control system monitoring one or more configuration switches on the generator set and adapting reference levels used for determining whether a fault condition exists according to the setting of said one or more configuration switches.

* * * * *